United States Patent
Jani et al.

(10) Patent No.: US 11,513,924 B2
(45) Date of Patent: Nov. 29, 2022

(54) FLEXIBLE MEMORY MAPPED INPUT/OUTPUT (I/O) SPACE DEFINITION FOR A VIRTUAL DEVICE IN A SCALABLE I/O VIRTUALIZATION (S-IOV) ARCHITECTURE

(71) Applicant: Intel Corporation, Santa Clara, CA (US)

(72) Inventors: Nrupal Jani, Hillsboro, OR (US); Manasi Deval, Portland, OR (US); Anjali Singhai Jain, Portland, OR (US); Parthasarathy Sarangam, Portland, OR (US); Mitu Aggarwal, Portland, OR (US); Neerav Parikh, Hillsboro, OR (US); Alexander H. Duyck, Aloha, OR (US); Kiran Patil, Portland, OR (US); Rajesh M. Sankaran, Portland, OR (US); Sanjay K. Kumar, Hillsboro, OR (US); Utkarsh Y. Kakaiya, Folsom, CA (US); Philip Lantz, Cornelius, OR (US); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 16/211,934

(22) Filed: Dec. 6, 2018

(65) Prior Publication Data
US 2019/0114194 A1    Apr. 18, 2019

Related U.S. Application Data

(60) Provisional application No. 62/721,483, filed on Aug. 22, 2018.

(51) Int. Cl.
*G06F 9/455*    (2018.01)
*G06F 11/20*    (2006.01)
(Continued)

(52) U.S. Cl.
CPC ........ *G06F 11/2023* (2013.01); *G06F 3/0622* (2013.01); *G06F 3/0631* (2013.01);
(Continued)

(58) Field of Classification Search
None
See application file for complete search history.

(56) References Cited

U.S. PATENT DOCUMENTS 5,623,688 A    4/1997  Ikeda et al.
7,213,246 B1   5/2007  Rietschote et al.
(Continued)

FOREIGN PATENT DOCUMENTS

WO        2011078855 A1    6/2011

OTHER PUBLICATIONS

Intel, "PCI-SIG SR-IOV Primer, An Introduction to SR-IOV Technology", Intel LAN Access Division, Jan. 2011, 28 pages.
(Continued)

*Primary Examiner* — Van H Nguyen
(74) *Attorney, Agent, or Firm* — Compass IP Law PC

(57) ABSTRACT

Examples may include a method of instantiating a virtual machine; instantiating a virtual device to transmit data to and receive data from assigned resources of a shared physical device by receiving input data requesting assigned resources for the virtual device, allocating assigned resources to the virtual device based at least in part on the input data, and mapping a page location in an address space of the shared physical device for a selected one of the assigned resources to a page location in a memory-mapped input/output (MMIO) space of the virtual device; and assigning the virtual device to the virtual machine, the virtual machine to transmit data to and receive data from the physical device via the MMIO space of the virtual device.

21 Claims, 14 Drawing Sheets

(51) Int. Cl.
| | |
|---|---|
| *G06F 3/06* | (2006.01) |
| *G06F 13/16* | (2006.01) |
| *G06F 13/42* | (2006.01) |
| *G06F 13/40* | (2006.01) |
| *G06F 15/173* | (2006.01) |
| *G06F 9/48* | (2006.01) |

(52) U.S. Cl.
CPC .......... *G06F 3/0659* (2013.01); *G06F 3/0673* (2013.01); *G06F 9/45558* (2013.01); *G06F 9/4856* (2013.01); *G06F 11/2007* (2013.01); *G06F 13/1668* (2013.01); *G06F 13/4068* (2013.01); *G06F 13/4221* (2013.01); *G06F 13/4282* (2013.01); *G06F 15/17331* (2013.01); *G06F 2009/4557* (2013.01); *G06F 2009/45562* (2013.01); *G06F 2009/45579* (2013.01); *G06F 2009/45583* (2013.01); *G06F 2009/45595* (2013.01); *G06F 2201/805* (2013.01); *G06F 2201/815* (2013.01); *G06F 2213/0026* (2013.01)

(56) References Cited

U.S. PATENT DOCUMENTS

| | | | |
|---|---|---|---|
| 7,394,828 B1 | 7/2008 | Wu | |
| 7,409,468 B2 | 8/2008 | Biran et al. | |
| 8,291,425 B2* | 10/2012 | Takashige | G06F 9/5077 718/104 |
| 8,495,252 B2* | 7/2013 | Lais | G06F 13/404 710/1 |
| 8,856,781 B2* | 10/2014 | Cowperthwaite | G06F 9/45558 718/1 |
| 9,086,904 B2 | 7/2015 | Goggin et al. | |
| 9,542,350 B1 | 1/2017 | Kissell et al. | |
| 9,940,263 B2* | 4/2018 | Wibling | G06F 9/544 |
| 10,055,136 B2* | 8/2018 | Tsirkin | G06F 3/061 |
| 10,228,981 B2* | 3/2019 | Kakaiya | G06F 9/545 |
| 10,509,758 B1 | 12/2019 | Habusha et al. | |
| 10,592,133 B1 | 3/2020 | Bothe et al. | |
| 10,725,807 B2* | 7/2020 | Tsirkin | G06F 9/45558 |
| 10,795,708 B1 | 10/2020 | Grechishkin et al. | |
| 2005/0213603 A1 | 9/2005 | Karighattam et al. | |
| 2005/0281190 A1 | 12/2005 | McGee et al. | |
| 2005/0281191 A1 | 12/2005 | McGee et al. | |
| 2006/0187928 A1 | 8/2006 | McGee et al. | |
| 2008/0072223 A1* | 3/2008 | Cowperthwaite | G06F 9/5077 718/1 |
| 2011/0239213 A1 | 9/2011 | Aswani et al. | |
| 2012/0167082 A1 | 6/2012 | Kumar et al. | |
| 2012/0185632 A1* | 7/2012 | Lais | G06F 13/404 710/308 |
| 2012/0254862 A1 | 10/2012 | Dong | |
| 2012/0278517 A1 | 11/2012 | Korger | |
| 2014/0012966 A1 | 1/2014 | Baphna et al. | |
| 2014/0373012 A1 | 12/2014 | Ylitalo et al. | |
| 2015/0242225 A1 | 8/2015 | Muller et al. | |
| 2015/0378759 A1 | 12/2015 | Pershin et al. | |
| 2016/0019176 A1 | 1/2016 | Challa et al. | |
| 2016/0342437 A1 | 11/2016 | Khemani et al. | |
| 2017/0199827 A1 | 7/2017 | Sankaran et al. | |
| 2018/0052701 A1 | 2/2018 | Kaplan et al. | |
| 2018/0088978 A1 | 3/2018 | Li et al. | |
| 2018/0107607 A1* | 4/2018 | Tsirkin | G06F 12/1081 |
| 2018/0114012 A1 | 4/2018 | Sood et al. | |
| 2018/0114013 A1 | 4/2018 | Sood et al. | |
| 2018/0129616 A1 | 5/2018 | Liang et al. | |
| 2018/0173554 A1 | 6/2018 | CaraDonna et al. | |
| 2018/0203801 A1 | 7/2018 | Leslie-Hurd et al. | |
| 2018/0217941 A1 | 8/2018 | Horovitz et al. | |
| 2018/0232517 A1 | 8/2018 | Roth et al. | |
| 2018/0321985 A1 | 11/2018 | Kakaiya et al. | |
| 2019/0108106 A1 | 4/2019 | Aggarwal et al. | |

OTHER PUBLICATIONS

Dong Yaozu et al: HYVI: "A Hybrid Virtualization Solution Balancing Performance and Manageability", IEEE Transactions on Parallel and Distributed Systems, vol. 25, No. 9, Sep. 20, 2013, 10 pgs.

Extended European Search Report for Patent Application No. 19182456.4, dated Jan. 7, 2020, 10 pages.

Nhyuk Kim et al: "NHVM: Design and Implementation of Linux Server Virtual Machine Using Hybrid Virtualization Technology", Computational Science and Its Applications (ICCSA), 2010 International Conference on, IEEE, Piscataway, NJ, USA, Mar. 23, 2010, 5 pgs.

Jonas Pfefferle et al: "A Hybrid I/O Virtualization Framework for ROMA-capable Network Interfaces", Virtual Execution Environments, ACM, 2 Penn Plaza, Suite 701 New York NY 10121-0701 USA, Mar. 14, 2015, 14 pgs.

"Overview of Intel® Software Guard Extensions (SGX) Instructions", Intel Software Developer Zone Blog, 2010, 6 pages.

Costan, "Intel SGX Explained", Computer Science and Artificial Intelligence Laboratory, MIT, 2016, 118 pgs.

Selvaraj, "Overview of Intel® Software Guard Extensions Instructions and Data Structures" Intel Software Developer Zone Blog, Jun. 10, 2016, 10 pages, https://software.intel.com/en-us/blogs/2016/06/10/overview-of-intel-software-guard-extensions-instructions-and-data-structures.

European First Office Action for Patent Application No. 19182456.4, dated Mar. 11, 2021, 6 pages.

First Office Action for U.S. Appl. No. 16/211,924, dated Sep. 30, 2021, 14 pages.

First Office Action for U.S. Appl. No. 16/211,955, dated Sep. 21, 2021, 7 pages.

First Office Action for U.S. Appl. No. 16/211,930 , dated May 11, 2021, 12 pages.

"Intel SGX SDK Functions for Enclave Creation", Better Tomorrow with Computer Science, http://https://insujang.github.io/2017-04-14/intel-sgx-sdk-functions-for-enclave-creation/, Apr. 14, 2017, 13 pages.

First Office Action for U.S. Appl. No. 16/211,950, dated Oct. 13, 2021, 55 pages.

Sankaran, Rajesh Madukkarumukumana, et. al , "Introducing Intel® Scalable I/O Virtualization", Intel, Software Developer, https://software.intel.com/content/www/us/en/develop/blogs/introducing-intel-scalable-io-virtualization.html, Published Jun. 25, 2018, 2 pages.

Bigelow, Stephen, "NIC teaming software enables load balancing and failover", Techarget, https://searchservervirtualization.techtarget.com/answer/NIC-teaming-software-enables-load-balancing-and-failover, published Feb. 6, 2018, 4 pages.

First Office Action for U.S. Appl. No. 16/211,941, dated Jan. 10, 2022, 9 pages.

Tian, Kevin, "Intel® Scalable I/O Virtualization", Think Open, LF Asia, LLC, Intel Corporation, Publshed 2017, 21 pages.

Final Office Action for U.S. Appl. No. 16/211,930, dated Dec. 16, 2021, 12 pages.

* cited by examiner

| | 31 | | 0 | Byte Offset |
|---|---|---|---|---|
| | NEXT CAPABILITY OFFSET | CAP V = 1 | PCI EXPRESS EXTENDED CAPABILITY ID = 0X23 | 00H |
| | DVSEC LEN = 0X18 | DVSEC REV = 0 | DVSEC VENDOR ID = 8086 | 04H |
| FLAGS (RO) 604 | FUNC DEP LINK (RO) 602 | | DVSEC ID FOR SCALABLE IOV = 5 | 08H |
| | SUPPORTED PAGE SIZES (RO) 606 | | | 0CH |
| | SYSTEM PAGE SIZE (RW) 608 | | | 10H |
| | CAPABILITIES (RO) 610 | | | 14H |

VDEV'S MMIO BAR DEFINITION 1100
ADVERTISEMENT PAGE

| |
|---|
| TYPE 0 (DESCRIPTION) REGISTERS: OFFSET, COUNT, STRIDE   1102 |
| TYPE 1 (DESCRIPTION) REGISTERS: OFFSET, COUNT, STRIDE   1104 |
| • • • |
| TYPE N (DESCRIPTION) REGISTERS: OFFSET, COUNT, STRIDE   1106 |

FIG. 11

FLEXIBLE MEMORY MAPPED INPUT/OUTPUT (I/O) SPACE DEFINITION FOR A VIRTUAL DEVICE IN A SCALABLE I/O VIRTUALIZATION (S-IOV) ARCHITECTURE

CROSS-REFERENCE TO RELATED APPLICATION

This application claims the benefit of U.S. Provisional Application No. 62/721,483, filed Aug. 22, 2018.

BACKGROUND

The introduction of the Single Root I/O Virtualization (SR-IOV) and Sharing specification, version 1.1, published Jan. 20, 2010 by the Peripheral Component Interconnect (PCI) Special Interest Group (PCI-SIG), was a notable advancement toward hardware-assisted high performance I/O virtualization and sharing for PCI Express devices. PCI Express (PCIe) is defined by PCI Express Base Specification, revision 4.0, version 1.0, published Oct. 5, 2017. Since then, the compute landscape has evolved beyond deploying virtual machines (VMs) for computer server consolidation to hyper-scale data centers which need to seamlessly add resources and dynamically provision containers. The new computing environment demands increased scalability and flexibility for I/O virtualization.

BRIEF DESCRIPTION OF THE DRAWINGS

FIG. 6 illustrates a diagram of an example Scalable IOV Designated Vendor Specific Extended Capability (DVSEC) structure.

FIG. 11 illustrates an example diagram of a virtual device (VDEV) memory mapped I/O (MMIO) base address register (BAR) definition advertisement page.

DETAILED DESCRIPTION

Figure 1:
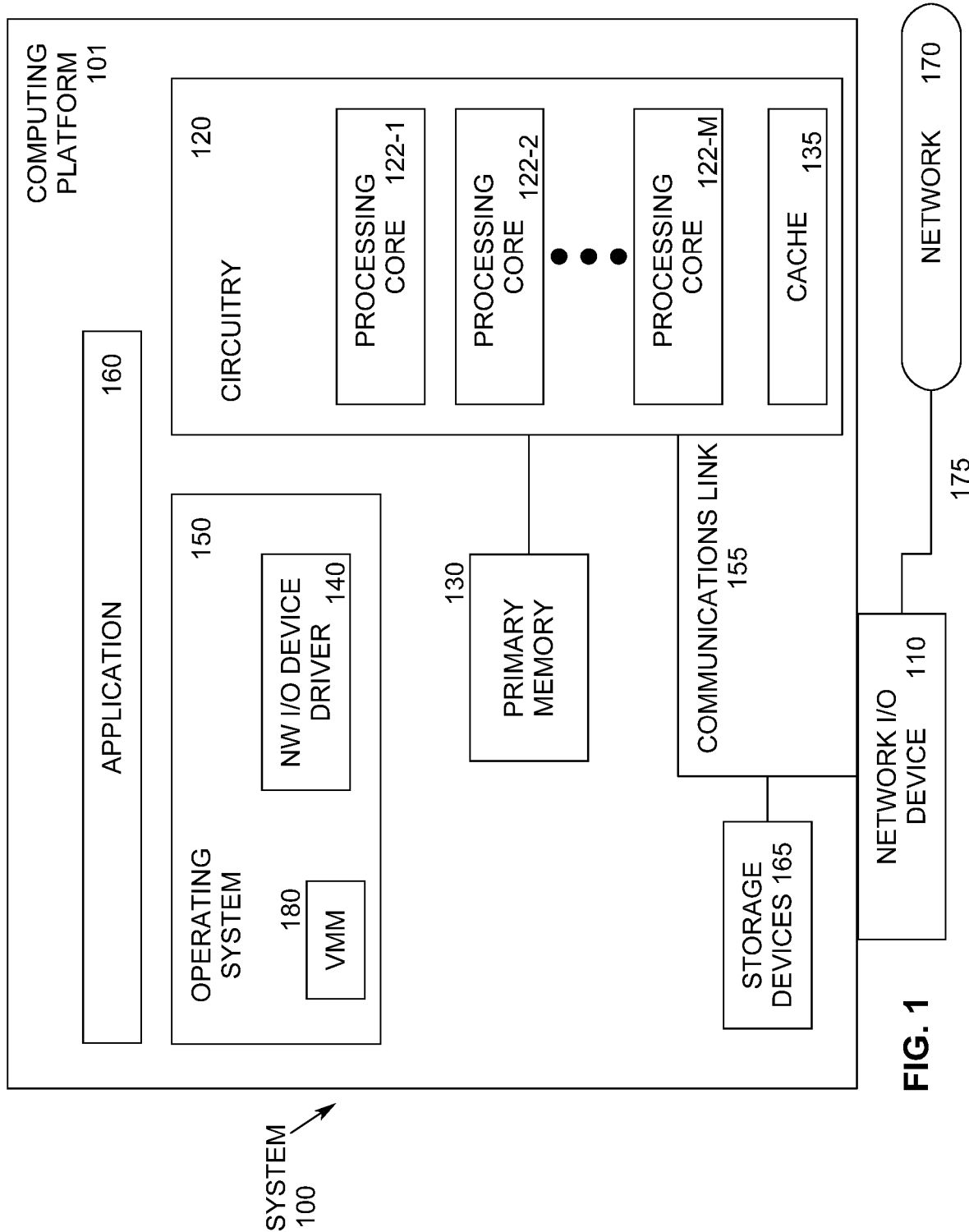
FIG. 1 illustrates an example computing system.

Embodiments of the present invention disclose a Scalable I/O virtualization (Scalable IOV) architecture and associated host computing platform and endpoint device capabilities. Scalable IOV defines a scalable and flexible approach to hardware-assisted I/O virtualization targeting hyper-scale usages. Scalable IOV builds on an already existing set of PCI Express capabilities, enabling the Scalable IOV architecture to be easily supported by compliant PCI Express endpoint device designs and existing software ecosystems.

Virtualization allows system software called a virtual machine monitor (VMM), also known as a hypervisor, to create multiple isolated execution environments called virtual machines (VMs) in which operating systems (OSs) and applications can run. Virtualization is extensively used in modern enterprise and cloud data centers as a mechanism to consolidate multiple workloads onto a single physical machine while still keeping the workloads isolated from each other. Besides VMs, containers provide another type of isolated environment that are used to package and deploy applications and run them in an isolated processing environment. Containers are constructed as either bare-metal containers that are instantiated as OS process groups or as machine containers that utilize the increased isolation properties of hardware support for virtualization. Containers are lighter weight and can be deployed in much higher density than VMs, potentially increasing the number of container instances on a computing platform by an order of magnitude.

Modern processors provide features to reduce virtualization overhead that may be utilized by VMMs to allow VMs direct access to hardware resources. Intel® Virtualization Technology (Intel® VT) (for IA-32 Intel® Architecture (Intel® VT-x) defines the Intel® processor hardware capabilities to reduce overheads for processor and memory virtualization. Intel® Virtualization Technology (Intel® VT) for Directed I/O (Intel® VT-d) defines the computing platform hardware features for direct memory access (DMA) and interrupt remapping and isolation that can be utilized to minimize overheads of I/O virtualization. I/O virtualization refers to the virtualization and sharing of I/O devices across multiple VMs or container instances. There are multiple approaches for I/O virtualization that may be broadly classified as either software-based or hardware-assisted.

With software-based I/O virtualization, the VMM exposes a virtual device (such as network interface controller (NIC) functionality, for example) to a VM. A software device model in the VMM or host OS emulates the behavior of the virtual device. The software device model translates virtual device commands to physical device commands before forwarding the commands to the physical device. Such software emulation of devices can provide compatibility to software running within VMs but incurs significant performance overhead, especially for high performance devices. In addition to the performance limitations, emulating virtual device accesses in software can be too complex for programmable devices such as Graphics Processing Units (GPUs) and Field-Programmable Gate Arrays (FPGAs) because these devices perform a variety of functions versus only a fixed set of functions. Variants of software-based I/O virtualization such as 'device paravirtualization' and 'mediated pass-through' allow the computing platform to mitigate some of the performance and complexity disadvantages with device emulation.

To avoid the software-based I/O virtualization overheads, VMMs may make use of platform support for DMA and interrupt remapping capability (such as Intel® VT-d) to support 'direct device assignment' allowing guest software to directly access the assigned device. This direct device assignment provides the best I/O virtualization performance since the VMM is no longer in the way of most guest software accesses to the device. However, this approach requires the device to be exclusively assigned to a VM and does not support sharing of the device across multiple VMs.

Single Root I/O Virtualization (SR-IOV) is a PCI-SIG defined specification for hardware-assisted I/O virtualization that defines a standard way for partitioning endpoint devices for direct sharing across multiple VMs or containers. An SR-IOV capable endpoint device may support one or more Physical Functions (PFs), each of which may support multiple Virtual Functions (VFs). The PF functions as the resource management entity for the device and is managed by a PF driver in the host OS. Each VF can be assigned to a VM or container for direct access. SR-IOV is supported by multiple high performance I/O devices such as network and storage controller devices as well as programmable or reconfigurable devices such as GPUs, FPGAs and other emerging accelerators.

In some embodiments, SR-IOV is implemented using PCIe. In other embodiments, interconnects other than PCIe may be used.

As hyper-scale computing models proliferate along with an increasing number of processing elements (e.g., processing cores) on modern processors, a high-volume computing platform (e.g., computer server) is used to host an order of magnitude higher number of bare-metal or machine containers than traditional VMs. Many of these usages such as network function virtualization (NFV) or heterogeneous computing with accelerators require high performance hardware-assisted I/O virtualization. These dynamically provisioned high-density usages (i.e., on the order of 1,000 domains) demand more scalable and fine-grained I/O virtualization solutions than are provided by traditional virtualization usages supported by SR-IOV capable devices.

Scalable IOV as described in embodiments of the present invention herein is a new approach to hardware-assisted I/O virtualization that enables highly scalable and high-performance sharing of I/O devices across isolated domains, while containing the cost and complexity for endpoint device hardware to support such scalable sharing. Depending on the usage model, the isolated domains may be traditional VMs, machine containers, bare-metal containers, or application processes. Embodiments of the present invention primarily refer to isolated domains as VMs, but the general principles apply broadly to other domain abstractions such as containers.

FIG. 1 illustrates an example computing system 100 supporting the Scalable IOV architecture. As shown in FIG. 1, computing system 100 includes a computing platform 101 coupled to a network 170 (which may be the Internet, for example, or a network within a data center). In some examples, as shown in FIG. 1, computing platform 101 is coupled to network 170 via network communication channel 175 and through at least one network I/O device 110 (e.g., a network interface controller (NIC)) having one or more ports connected or coupled to network communication channel 175. In an embodiment, network I/O device 110 is an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, virtual machine manager (VMM) 180 (also known as a hypervisor), at least one application 160, and one or more storage devices 165. In one embodiment, OS 150 is Linux™. In another embodiment, OS 150 is Windows® Server. In an embodiment, application 160 represents one or more application programs executed by one or more guest VMs (not shown). Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a Peripheral Component Interface Express (PCIe) bus conforming to revision 4.0 or other versions of the PCIe standard. In some examples, operating system 150, NW I/O device driver 140, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-$m$, where "m" is any positive whole integer greater than 2. In an embodiment, OS 150, NW I/O device driver 140, and application 160 are executed by one or more processing cores 122-1 to 122-$m$. In other embodiments, there are other endpoint devices coupled to communications link 155 (e.g., PCIe interconnect) that support Scalable IOV capabilities.

In some examples, computing platform 101, includes but is not limited to a computer server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems and connects them through network connections (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Figure 2:
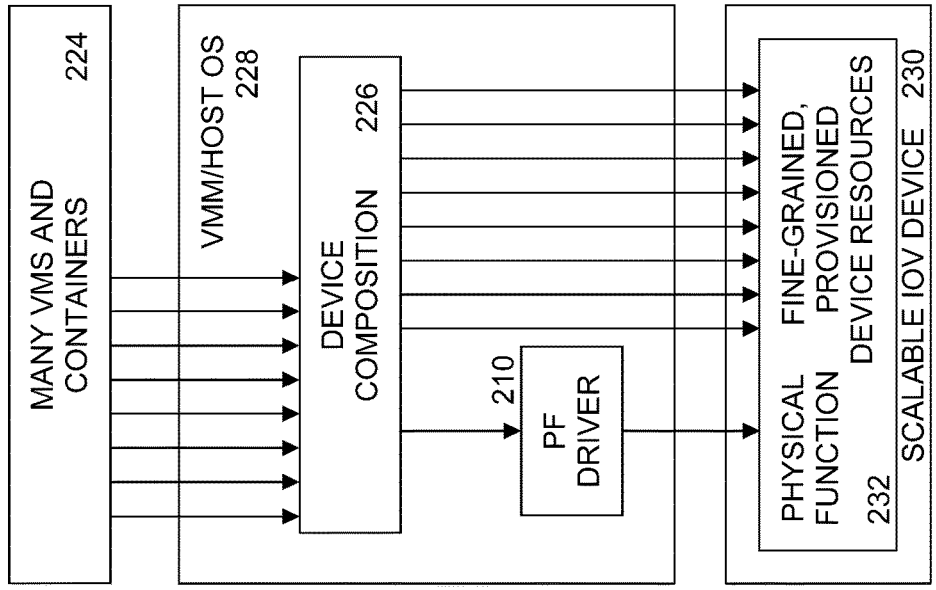
FIG. 2 illustrates an example diagram of some high-level differences between the SR-IOV and Scalable I/O virtualization (IOV) architectures.
Figure 2:
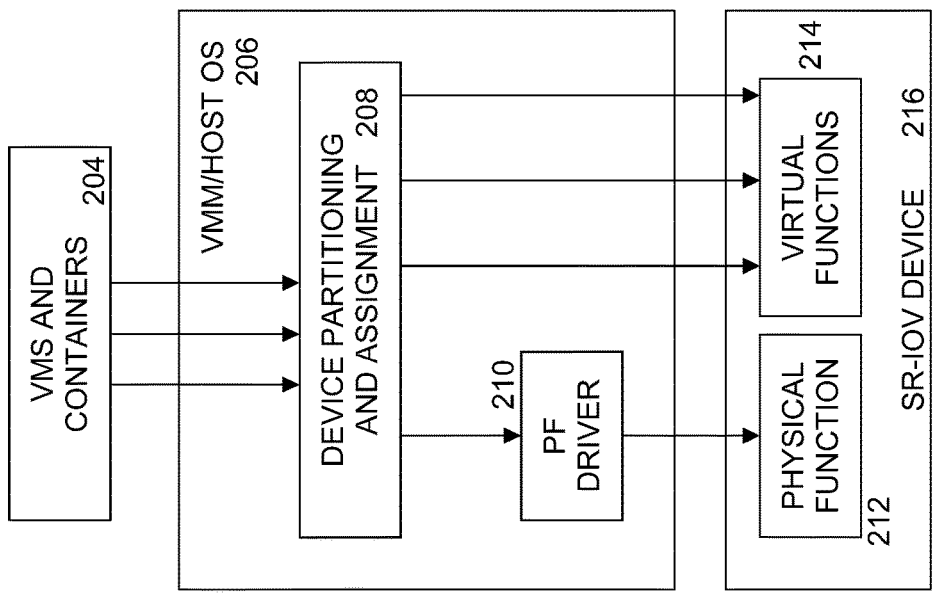

FIG. 2 illustrates an example diagram 200 of some high-level differences between SR-IOV 202 and Scalable IOV 222 architectures. Unlike the coarse-grained device partitioning and assignment approach 208 adopted by SR-IOV to create multiple VFs 214 on a PF 212, the Scalable IOV architecture 222 enables software to flexibly compose virtual devices utilizing hardware assists for device sharing at finer granularity. Frequent (i.e., performance critical) operations on the composed virtual device are mapped directly to the underlying device hardware (e.g., scalable IOV device 230), while infrequent operations are emulated through device-specific composition software 226 in VMM/Host OS 228. This is different than the existing architecture for SR-IOV devices 202, where only the device-agnostic PCI Express architectural resources (such as configuration space registers and message signaled interrupts extended (MSI-X) capability registers) of the virtual device are virtualized in software, and the rest of the virtual device resources (including all other memory mapped I/O (MMIO)) are mapped directly to the underlying VF 214 hardware resources (e.g., SR-IOV device 216).

In the SR-IOV architecture 202 using hardware replication, a plurality of VMs and containers 204 run on top of a VMM and/or host OS 206. Device partitioning and assignment logic 208 assigns I/O requests to PF driver 210 which is coupled with physical function (PF) 212 in SR-IOV device 216, or to virtual functions (VFs) 214 in SR-IOV device 216. In contrast, in the Scalable IOV architecture 222 of embodiments of the present invention using replication and composition, many more VMs and containers 224 are supported. VMs and/or containers 224 call device composition logic 226 in VMM/host OS 228 to implement I/O requests. Device composition logic 226 assigns I/O requests to PF driver 210, which is coupled with fine-grained, provisioned device resources (which also includes physical functions) in Scalable IOV device 230, or directly to fine-grained, provisioned device resources 232 in Scalable IOV device 230.

The Scalable IOV architecture provides benefits over SR-IOV. Fine-grained provisioning of device resources to VMs 224 along with software emulation of infrequent device accesses enables devices to increase sharing scalability at lower hardware cost and complexity. The Scalable IOV architecture provides system software such as VMM/Host OS 228 the flexibility to share device resources with different address domains using different abstractions (e.g., application 160 processes to access through system calls and VMs/containers 224 to access through virtual device interfaces). Through software-controlled dynamic mapping of virtual devices (VDEVs) to device resources, the Scalable IOV architecture of embodiments of the present invention also enables VMMs to over-provision device resources to VMs 224.

The present approach also enables VMMs 228 to easily maintain generational compatibility in a data center. For example, in a data center with physical machines containing different generations (e.g., versions) of the same I/O device, a VMM can use software emulation to virtualize a VDEV's MMIO-based capability registers to present the same VDEV capabilities irrespective of the different generations of physical I/O device. This is to ensure that the same guest OS image with a VDEV driver can be deployed or migrated to any of the physical machines.

The Scalable IOV architecture is composed of the following elements. The architecture supports PCI Express endpoint device requirements and capabilities. The architecture supports host platform (e.g., Root Complex) requirements including enhancements to direct memory access (DMA) remapping hardware. In an embodiment, these requirements are implemented on Intel processor-based computing platforms as part of Intel® Virtualization Technology for Directed I/O, Rev 3.0 or higher. The architecture also supports a reference software architecture envisioned for enabling Scalable IOV, including host system software (OS and/or VMM 228) enabling infrastructure and endpoint device specific software components such as host driver, guest driver, and a virtual device composition module (VDCM).

PCI Express endpoint devices may support requirements to operate with Scalable IOV independent of its support for SR-IOV. This enables device implementations that already support SR-IOV to maintain this capability for backwards compatibility while adding the additional capabilities to support Scalable IOV.

In embodiments of the present invention, an endpoint physical function is capable of both SR-IOV and Intel Scalable-IOV to be enabled to operate in one mode or other, but not concurrently.

The PCI Express SR-IOV architecture follows a near complete functional hardware replication of the Physical Function (PF) 212 hardware for its Virtual Functions (VFs) 214. This is realized by most SR-IOV device implementations by replicating most of the PF's hardware/software interface for each of its VFs, including resources such as memory mapped resources, MSI-X storage and capabilities such as Function Level Reset (FLR). Such a functional replication approach can add to device complexity and impose limitations to scale to large numbers of VFs.

The hardware-software interface for I/O controller implementations can be categorized as (a) slow path control/configuration operations that are less frequent and have the least impact on overall device performance; and (b) fast path command/completion operations that are frequent and have a higher impact on the overall device performance. This distinction of slow path versus fast path operations are practiced by many high performance I/O devices supporting direct user-mode access. The Scalable IOV architecture extends such device designs to define a software composable approach to I/O virtualization and sharing.

The Scalable IOV architecture requires endpoint devices (i.e., scalable IOV devices 230) to organize their hardware/software interfaces into fast path (frequent) and slow path (infrequent) accesses. Which operations and accesses are distinguished as slow path versus fast path is controlled by device implementation. Slow path accesses typically include initialization, control, configuration, management, error processing, and reset operations. Fast path accesses typically include data path operations involving work submission and work completion processing. With this organization, slow path accesses to the virtual device from a guest VM are trapped and emulated by device-specific host software while fast path accesses are directly mapped on to the physical device. This approach enables simplified device designs (compared to SR-IOV full functional replication), without compromising I/O virtualization scalability or performance.

Additionally, the hybrid approach provides increased flexibility for software to compose virtual devices through fine-grained provisioning of device resources.

High performance I/O devices support a large number of command/completion interfaces for efficient multiplexing/de-multiplexing of I/O requests and in some usages to support user-mode I/O requests. A few examples of such devices are: a) high-bandwidth network controllers supporting thousands of transmit/receive (TX/RX) queues across a large number of Virtual Switch Interfaces (VSIs); b) storage controllers such as NVM Express (as described in the non-volatile memory (NVM) Express specification, version 1.3c, available at nvmexpress.org) devices supporting many command and completion queue pair constructs; c) accelerator devices such as GPUs supporting a large number of graphics and/or compute contexts; d) reconfigurable FPGA devices with Accelerator Functional Units (AFUs) supporting a large number of execution contexts; and e) remote direct memory access (RDMA) capable devices supporting thousands of Queue Pair (QP) interfaces.

The Scalable IOV architecture takes advantage of multi-queue/multi-context capable high performance I/O device designs and defines an approach to share these devices at a finer granularity (queues, queue bundles, contexts, etc.) than SR-IOV VF granularity. To achieve this finer-grained sharing, the Scalable IOV architecture of embodiments of the present invention defines the granularity of sharing of a device as an 'Assignable Device Interface' (ADI) on the device. According to an embodiment, an ADI is the unit of assignment for a Scalable IOV capable device. Each ADI instance on the device encompasses the set of resources on the device that are allocated by software to support the fast path operations for a virtual device (VDEV).

Conceptually, ADI is similar to a SR-IOV virtual function (VF), except it is finer-grained and maps to the fast path operations for a virtual device. Unlike VFs, all ADIs on a Physical Function (PF) share the Requester-ID (e.g., Bus/Device/Function number) of the PF, have no PCI configuration space registers, share the same Base Address Register (BAR) resources of the PF (i.e., no virtual function base address registers (VFBARs)), and do not require replicated MSI-X storage. Instead of MSI-X table storage for each ADI, PF implements a device specific Interrupt Message Storage (IMS). IMS is similar to MSI-X table storage in purpose but is not architectural and instead is implemented in a device specific manner for maximum flexibility. Additionally, unlike some SRIOV devices which implement VF⇔PF communication channels and 'resource remapping logic' on the device, ADIs use slow-path emulation to provide such functionality. ADI's memory-mapped register space is laid out such that fast path registers are in separate system page size regions than the slow path registers. The host driver for a Scalable IOV capable device defines the collection of device back-end resources that are grouped to form an ADI.

Figure 3:
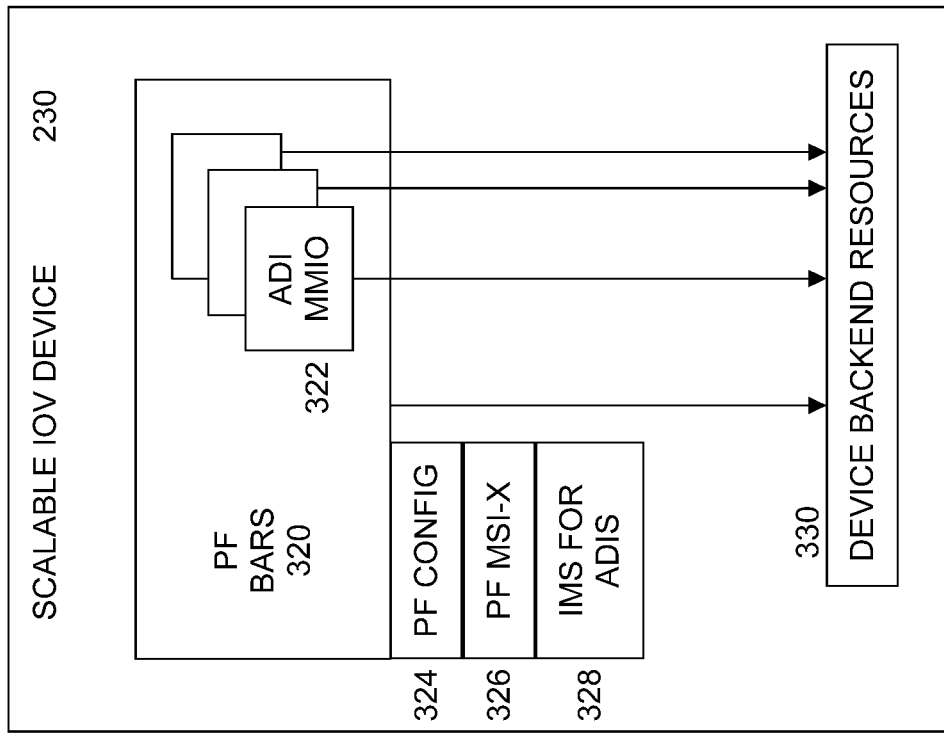
FIG. 3 illustrates an example diagram of some differences between SR-IOV capable and Scalable IOV capable endpoint devices.
Figure 3:
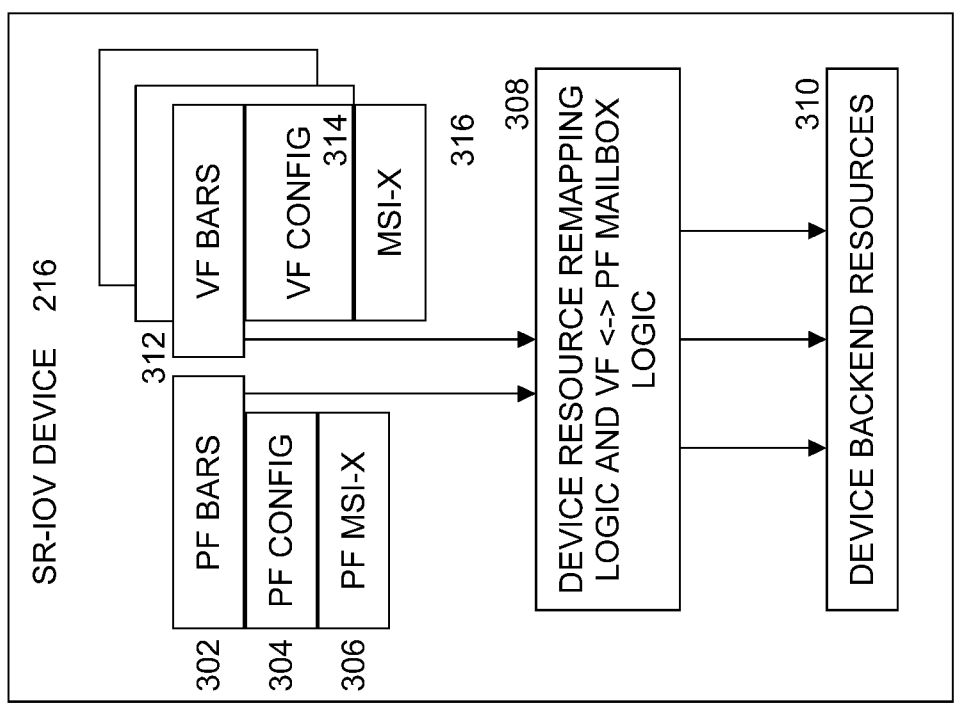

FIG. 3 illustrates an example diagram 300 of some differences between SR-IOV capable and Scalable IOV capable endpoint devices. SR-IOV device 216 includes physical function (PF) base address registers (PF BARs) 302, PF configuration (PF config) circuitry 304, and PF message signaled interrupt extended (MSI-X) circuitry 306. PF MSI-X 306 provides the MSI-X capability as defined by the PCI Express Base Specification. SR-IOV device 216 also includes a plurality of sets of virtual function (VF) VF BARs 312, VF config 314, and MSI-X 316. PF BARs 302 and VF BARs 312 are coupled to device resource remapping logic and VF⇔PF mailbox logic 308, which calls device backend resources 310. In an embodiment, device backend resources 310 includes a plurality of queues for storing packets. Device backend resources 310 may include command/status registers, on device queues, references to in-memory queues, local memory on the device, or any other device specific internal constructs.

Scalable IOV device 230 includes PF BARs 320, which also includes a plurality of ADI MMIO components 322. PF BARS 320 are coupled with PF config 324, PF MSI-X 326, and interrupt message storage (IMS) for ADIs 328. PF MSI-X 326 provides the MSI-X capability as defined by the PCI Express Base Specification. IMS 328 enables devices to store the interrupt messages for ADIs in a device-specific optimized manner without the scalability restrictions of PCI Express defined MSI-X capability. PF BARs 320 and ADI MMIO components 322 are coupled with device backend resources 330. Device backend resources 330 may include command/status registers, on device queues, references to in-memory queues, local memory on the device, or any other device specific internal constructs.

The device-specific and light-weight nature of ADIs, along with the flexibility to emulate portions of the virtual device functionality in device-specific host software, enables device hardware implementations to compose a large number of virtual devices for scalable sharing at lower device cost and complexity compared to equivalent scaling of SR-IOV VFs.

With the SR-IOV architecture, each VF 214 in a SR-IOV device 216 is identified by a PCI Express Requester identifier (ID) (RID), allowing DMA remapping hardware support in Root Complex (such as Intel® VT-d) to apply unique address translation functions for upstream requests from the VF. A RID is a bus, device and function number identity for a PCI Express PF or VF. RIDs are also used for routing transactions such as read completions for the PCI Express device hierarchy, and hence can be a scarce resource on some platform topologies with large I/O fan-out designs. This can impose scalability limitations on the number of isolated domains a SR-IOV device can support.

The Scalable IOV architecture of embodiments of the present invention addresses the platform scalability issue by sharing the RID of the physical function (PF) 232 with all of its ADIs, and instead assigning ADIs a Process Address Space Identifier (PASID) that is conveyed in upstream transactions using a PCI Express PASID transaction layer packet (TLP) Prefix. Refer to the PCI Express specification for details on the PASID TLP Prefix. The computing platform 101 support for the Scalable IOV architecture enables unique address translation functions for upstream requests at PASID granularity. Unlike RID, PASID is not used for transaction routing on the I/O fabric but instead is used only to convey the address space targeted by a memory transaction. Additionally, PASIDs are 20-bit IDs compared to 16-bit RIDs, which gives 16× more identifiers. This use of PASIDs by the Scalable IOV architecture enables significantly more domains to be supported by Scalable IOV devices.

Figure 4:
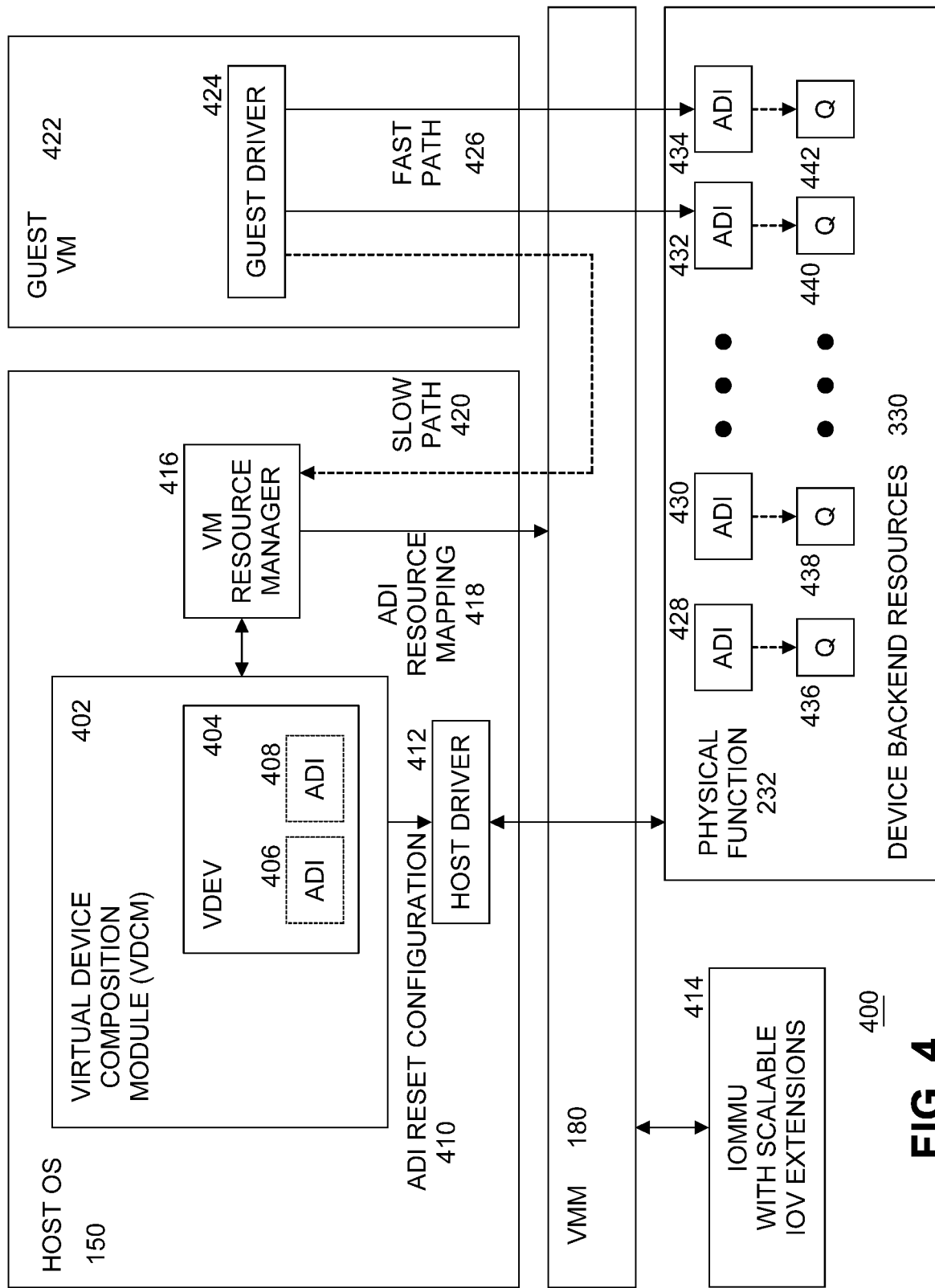
FIG. 4 illustrates an example diagram of a high-level software architecture for Scalable IOV.

FIG. 4 illustrates an example diagram of a high-level software architecture 400 for Scalable IOV. FIG. 4 illustrates components used to describe the Scalable IOV architecture and is not intended to illustrate all virtualization software or specific implementation choices. To support broad types of device classes and implementations, the software responsibilities are abstracted between system software (OS 150/VMM 180) and device-specific driver software components.

Thus, FIG. 4 is a description of system software (host OS 150 and VMM 180) and device-specific software roles and interactions to compose hardware-assisted virtual devices along with how to manage device operations. The software architecture described is focused on I/O virtualization for virtual machines and machine containers. However, the principles can be applied with appropriate software support to other domains such as I/O sharing across bare-metal containers or application processes.

The Scalable IOV architecture of embodiments of the present invention introduces a device-specific software component referred to as the Virtual Device Composition Module (VDCM) 402 that is responsible for composing one or more virtual device (VDEV) 404 instances utilizing one or more Assignable Device Interfaces (ADIs) 406, 408, which the VDCM does by emulating VDEV slow path operations/accesses and mapping the VDEV fast path accesses to ADI instances allocated and configured on the physical device. Unlike SRIOV VFs 214, VDCM 402 allows Scalable IOV devices 230 to avoid implementing slow path operations in hardware and instead to focus device hardware to efficiently scale the ADIs.

Additionally, virtualization management software (e.g., a VMM 180) makes use of VDCM 402 software interfaces for enhanced virtual device resource and state management, enabling capabilities such as suspend, resume, reset, and migration of virtual devices. Depending on the specific VMM implementation, VDCM 402 is instantiated as a separate user or kernel module or may be packaged as part of a host driver.

Host driver 412 for a Scalable IOV capable device 230 is conceptually equivalent to a SR-IOV PF driver 210. Host driver 412 is loaded and executed as part of host OS 150 or VMM (hypervisor) software 180. In addition to the role of a normal device driver, host driver 412 implements software interfaces as defined by host OS 150 or VMM 180 infrastructure to support enumeration, configuration, instantiation, and management of a plurality of ADIs 428, 430, 432, 434. Host driver 412 is responsible for configuring each ADI such as its PASID identity, device-specific Interrupt Message Storage (IMS) 328 for storing ADI's interrupt messages, MMIO register resources 322 for fast-path access to the ADI, and any device-specific resources.

Table 1 illustrates an example high-level set of operations that host driver 412 supports for managing ADIs. These operations are invoked through software interfaces defined by specific system software (e.g., host OS 150 or VMM 180) implementations.

TABLE 1

Host driver interfaces for Scalable IOV
Description

Scalable IOV capability reporting for the PF.
Enumeration of types and maximum number of ADIs/VDEVs.
Enumeration of resource requirements for each ADI type.
Enumeration and setting of deployment compatibility for ADIs.
Allocation, configuration, reset, drain, abort, release of ADI and its constituent resources.
Setting and managing PASID identity of ADIs.
Managing device-specific Interrupt Message Storage (IMS) for ADIs.
Enabling guest to host communication channel (if supported).
Configuring device-specific QoS properties of ADIs.
Enumerating and managing migration compatibility of ADIs.
Suspending/saving state of ADIs, and restoring/resuming state of ADIs.

Virtual Device Composition Module (VDCM) 402 is a device specific component responsible for composing one or more virtual device (VDEV) 404 instances using one or more ADIs 406, 408 allocated by host driver 412. VDCM 402 implements software-based virtualization of VDEV 404 slow path operations and arranges for fast path operations to be submitted directly to the backing ADIs 428, 430, 432, 434. Host OS 150 or VMM 180 implementations supporting such hardware-assisted virtual device composition may require VDCM to be implemented and packaged by device vendors in different ways. For example, in some OS or VMM implementations, VDCM 402 is packaged as user-space modules or libraries that are installed as part of the device's host driver 412. In other implementations, VDCM 402 is a kernel module. If implemented as a library, VDCM 402 may be statically or dynamically linked with the VMM-specific virtual machine resource manager (VMRM) responsible for creating and managing VM resources. If implemented in the host OS kernel, VDCM 402 can be part of host driver 412.

Guest driver 424 for a Scalable IOV capable device 230 is conceptually equivalent to a SR-IOV device VF driver. In an embodiment, guest driver 424, resident in guest VM 422, manages VDEV instances 404 composed by VDCM 402. Fast path accesses 426 by guest driver 424 are issued directly to ADIs 432, 434 behind VDEV 404, while slow path accesses 420 are intercepted and virtualized by VM resource manager (VMRM) 416 and VDCM 402. Similar to implementation choices available for SR-IOV PF 212 and VF 214 drivers, for a target OS 150, guest driver 424 is deployed as a separate driver or as a unified driver that supports both host OS 150 and guest VM 422 functionality. For existing SR-IOV devices 216, if VDEV 404 is composed to behave like an existing VF 214, Scalable IOV guest driver 424 can even be the same as the SR-IOV VF 214 driver for backward compatibility.

In embodiments of the present invention, Virtual Device (VDEV) 404 is the abstraction through which a shared physical device (e.g., Scalable IOV device 230) is exposed to software in guest VM 422. VDEVs 404 are exposed to guest VM 422 as virtual PCI Express enumerated devices, with virtual resources such as virtual Requester-ID, virtual configuration space registers, virtual memory BARs, virtual MSI-X table, etc. Each VDEV 404 may be backed by one or more ADIs 428, 430, 432, 434. The ADIs backing a VDEV 404 typically belong to the same PF 232 but implementations are possible where they are allocated across multiple PFs (for example to support device fault tolerance or load balancing).

A PF 232 may support multiple types of ADIs, both in terms of number of device backend resources 330 and in terms of functionality. Similarly, multiple types of VDEV compositions are possible (with respect to the number of backing ADIs, functionality of ADIs, etc.) on a Scalable IOV device 230. VDCM 402 may publish support for composing multiple 'VDEV types', enabling a virtual machine resource manager (VMRM) 416 to request different types of VDEV instances for assigning to virtual machines (VMs). VDCM 402 uses host OS 150 and VMM 180 defined interfaces to allocate and configure resources needed to compose a plurality of VDEV 404 instances. VDEV instances may be assigned to VMs 422 in the same way as SR-IOV VFs 214.

VDEV 404 may be composed of a static number of ADIs that are pre-allocated at the time of VDEV instantiation or composed dynamically by VDCM 402 in response to guest driver 424 requests to allocate/free resources. An example of statically allocated ADIs is a virtual NIC (vNIC) with a fixed number of RX/TX queues. An example of dynamically allocated ADIs is a virtual accelerator device, where context allocation requests are virtualized by VDCM 402 to dynamically create accelerator contexts as ADIs.

VDEV's MMIO registers 322 may be composed with any of the following methods for any system page size regions of the VDEV MMIO space.

1) Direct Mapped to ADI MMIO. As part of composing a VDEV instance 404, VDCM 402 defines the system page size ranges in VDEV virtual BARs in guest physical address (GPA) space that need to be mapped to MMIO page ranges of backing ADIs in host physical address (HPA) space. VDCM 402 may request VMM 180 to set up GPA to HPA mappings in the host processor 122-1 . . . 122-M virtualization page tables, enabling direct access by guest driver 424 to the ADI. These direct mapped MMIO ranges support fast path operations 426 to ADIs 432, 434.

2) VDEV MMIO Intercepted and Emulated by VDCM. Slow path registers for a VDEV are virtualized by VDCM 402 by requesting VMM 180 to not map these MMIO regions 322 in the host processor virtualization page tables, thus forcing host intercepts when guest driver 424 accesses these registers. These intercepts are provided to the VDCM module 402 composing the VDEV instance 404, so that VDCM 402 may virtualize such intercepted accesses by itself or through interactions with host driver 412. To minimize the software complexity on slow path access emulation, host OS 150 or virtualization providers may restrict guest drivers 424 to use simple memory move operations of eight bytes or less to access VDEV's slow path MMIO resources. VDEV registers that are read frequently and have no read side-effects, but require VDCM intercept and emulation on write accesses, may be mapped as read-only to backing memory pages provided by VCDM. This supports high performance read accesses to these registers along with virtualizing their write side-effects by intercepting on guest write accesses. 'Write intercept only' registers must be hosted in separate system page size regions from the 'read-write intercept' registers on the VDEV MMIO layout.

3) VDEV MMIO 322 Mapped to Memory 130. VDEV registers that have no read or write side effects may be mapped to primary memory 130 with read and write access. These registers may contain parameters or data for a subsequent operation performed by writing to an intercepted register. Device implementations may also use this approach to define virtual registers for VDEV-specific communication channels between guest driver 424 and VDCM 402. Guest driver 424 writes data to the memory backed virtual registers without host intercepts, followed by a mailbox register access that is intercepted by the VDCM. This optimization reduces host intercept and instruction emulation cost for passing data between guest and host. Such an approach enables guest drivers 424 to implement such channels with VDCM more generally than hardware-based communication doorbells (as is often implemented between SR-IOV VFs 214 and PF 212) or without depending on guest OS or VMM specific para-virtualized software interfaces.

VDEVs 404 expose a virtual MSI or virtual MSI-X capability that is emulated by VDCM 402. Guest driver 424 requests VDEV interrupt resources normally through guest VM 422 interfaces, and the guest VM may service this by programming one or more Interrupt Messages through the virtual MSI or virtual MSI-X capability of VDEV 404.

For typical virtual device compositions, there are two sources of interrupts delivered as VDEV interrupts to guest driver 424. One source is VDCM software 402 itself that may generate virtual interrupts on behalf of the VDEV to be delivered to the guest driver. These are software generated interrupts by the slow path operations of the VDEV emulated by the VDCM. The other source of interrupts is ADI instances 432, 434 on the device that are used to support fast path operations of VDEV 404. ADI generated interrupts use interrupt messages stored in Interrupt Message Storage (IMS) 328.

When guest VM 422 programs the virtual MSI or MSI-X register, the operation is intercepted and virtualized by VDCM 402. For slow path virtual interrupts, the VDCM requests virtual interrupt injection to the guest through the VMM 180 software interfaces. For fast path interrupts from ADIs, the VDCM invokes host driver 412 to allocate and configure required interrupt message address and data in the IMS. This is conceptually similar to how MSI-X interrupts for SR-IOV VFs are virtualized by some virtualization software, except the interrupt messages are programmed in the IMS by host driver 412 as opposed to in an MSI-X table by a PCI driver.

For device-specific usages and reasons, Scalable IOV capable devices 230 may choose to build communication channels between guest driver 424 and VDCM 402. These communication channels can be built in a guest and host system software agnostic manner with either of below methods.

1) Software emulated communication channel. Such a channel is composed by VDCM 402 using one or more system page size regions in VDEV MMIO space set up as fully memory-backed to enable sharing of data between guest VM 422 and host OS 150. A host intercepted system page size region in VDEV MMIO space is also set up to signal a guest action to the host. Optionally, a virtual interrupt may also be setup by the VDCM to signal the guest about completion of asynchronous communication channel actions.

2) Hardware mailbox-based communication channel. If the communication between guest driver 424 and host driver 412 is frequent and the software emulation-based communication channel overhead is significant, Scalable IOV device 230 may implement communication channels based on hardware mailboxes. This is similar to communication channels between SR-IOV VFs 214 and PF 212 in some existing designs.

Shared Virtual Memory (SVM) refers to usages where a device is operating in the CPU virtual address space of the applications sharing the device. SVM usage is enabled with system software programming the DMA remapping hardware to reference the CPU page tables for requests with PASID representing the target applications virtual address space. Devices supporting such SVM capability do not require pages that are accessed by the device to be pinned and instead supports PCI Express Address Translation Services (ATS) and Page Request Service (PRS) capabilities to support recoverable device page faults. Refer to PCI Express specification for details on ATS and PRS capabilities.

A device supporting the Scalable IOV architecture can independently support SVM usages on ADIs allocated to host applications or for ADIs allocated to guest applications through the VDEV instance assigned to guest VM 422. Both the host and guest SVM usages are transparent to the ADI operation. One difference is in the address translation function programming of the Root Complex DMA remapping hardware. The address translation function programmed for PASIDs representing host SVM usage refers to respective CPU virtual address to physical address translation, while the address translation function programmed for PASIDs representing guest SVM usage refers to respective nested address (guest virtual address to guest physical address and further to host physical address) translation.

A set of requirements and capabilities for an endpoint device to support the Scalable IOV architecture will now be described. The requirements apply to both Root-Complex Integrated Endpoint (RCIEP) and PCI Express Endpoint (PCIEP) devices. In an embodiment, the endpoint device may be a NIC, a storage controller, a GPU, a FPGA, an application specific integrated circuit (ASIC), or other circuitry.

As described previously, the Scalable IOV architecture defines the constructs for fine-grained sharing on endpoint devices (i.e., scalable IOV devices 230) as Assignable Device Interfaces (ADIs) 428, 430, 432, 434. ADIs form the unit of assignment and isolation for Scalable IOV capable devices 230 and are composed by software to form virtual devices. The requirements for endpoint devices for enumeration, allocation, configuration, management and isolation of ADIs is as follows.

Resources on an endpoint device associated with fast path work submission, execution and completion operations are referred to as device backend resources.

Assignable Device Interfaces (ADIs) 428, 430, 432, 434 refer to a set of device backend resources 330 that are allocated, configured and organized as an isolated unit, forming the unit of device sharing. The type and number of backend resources grouped to compose an ADI is device specific. For example, for a network controller device (such as an Ethernet NIC), an ADI may be composed of a set of TX/RX queues and resources associated with a Virtual Switch Interface (VSI). An ADI on a storage controller may be the set of command queues and completion queues associated with a storage namespace. Similarly, an ADI on a GPU may be organized as a set of graphics or compute contexts created on behalf of a virtual-GPU device instance. Depending on the design, ADI on an FPGA device may be an entire Accelerator Function Unit (AFU) or a context on a multi-context capable AFU.

The SR-IOV architecture specifies the allocation of PCI Express architectural resources through the VF construct but leaves it to device implementations on how the device backend resources are allocated and associated with specific VFs 214. Devices that want to flexibly provision a variable number of backend resources to VFs 214 (e.g., one queue-pair to a first VF and one queue-pair to another VF) need to implement another level of 'resource remapping logic' (as shown at block 308 in FIG. 3) within the endpoint device to map which device backend resources 310 are accessible through specific VFs 214 and isolated from access through other VFs. Such resource remapping logic 308 in the endpoint device increases device complexity as the number of VFs and backend resources are scaled.

The SR-IOV software architecture provides for a virtual device instance to be composed of a single VF, whereas the Scalable IOV software architecture of embodiments of the present invention allows software to compose a virtual device (VDEV) instance through the use of one or more ADIs. This enables endpoint device hardware designs to avoid the need for complex resource remapping logic internal to the endpoint device.

For example, consider a device that uses queue-pairs (QPs) 436, 438, 440, 442 as backend resources 330, and a VM 422 that needs eight QPs in the VDEV for its workloads. In the SR-IOV architecture designs will have to map a VF 214 to eight QPs, with either static partitioning of eight QPs per VF, or dynamic partitioning of eight QPs to a VF using resource remapping logic 308 in the endpoint device. An equivalent Scalable IOV capable device design treats each QP as an ADI 428, 430, 432 or 434 and uses VDCM software 402 to compose a VDEV using eight ADIs. In this case the resource remapping functionality is implemented in VDCM 402.

Figure 5:
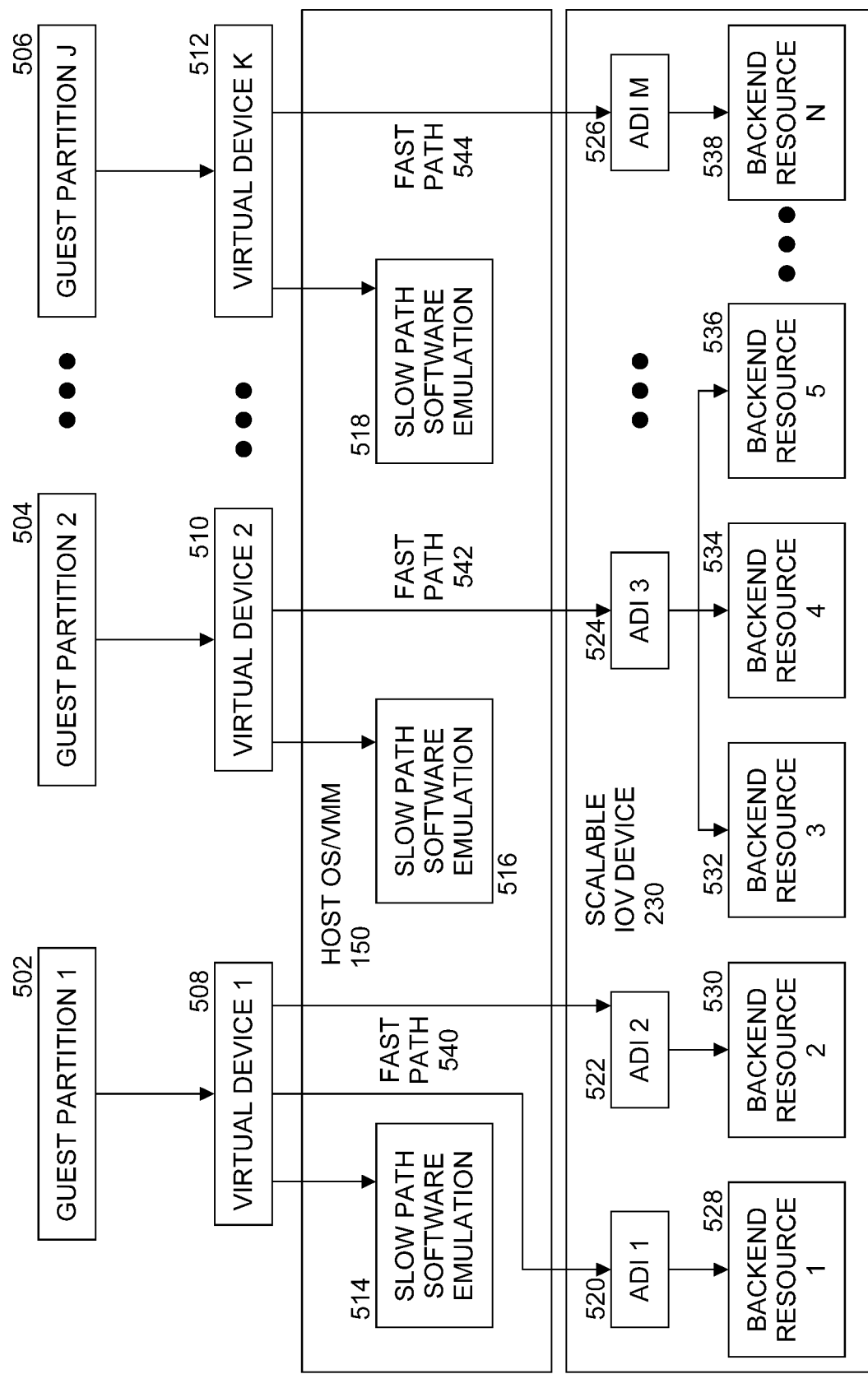
FIG. 5 illustrates an example diagram of a logical view of Assignable Device Interfaces (ADIs) with varying numbers of device backend resources, and virtualization software composing virtual device (VDEV) instances with one or more ADIs.

FIG. 5 illustrates an example diagram 500 of a logical view of ADIs with a varying number of device backend resources 330, and virtualization software composing virtual device instances 508, 510, 512 with one or more ADIs 520, 522, 524, 526. There are one or more guest partitions such as guest partition 1 502, guest partition 2 504, . . . guest partition J 506, where J is a natural number, being executed by computing platform 101. There are one or more virtual devices (VDEVs) such as virtual device 1 508, virtual device 2 510, . . . virtual device K 512, where K is a natural number, being executed by computing platform 101. Each guest partition may call one or more virtual devices for I/O requests. For example, guest partition 502 calls virtual device 1 508, guest partition 2 504 calls virtual device 2 510, and so on to guest partition J calls virtual device K 512. There may be any number of guest partitions. There may be any number of virtual devices. The maximum number of virtual devices being called by any one guest partition is implementation dependent. Within endpoint device hardware (i.e., Scalable IOV device 230), there are one or more ADIs, such as ADI 1 520, ADI 2 522, ADI 3 524, . . . . ADI M 526, where M is a natural number. There may be any number of ADIs in Scalable IOV device 230 (i.e., it is implementation dependent), and there are one or more Scalable IOV devices (e.g., network I/O devices 110) in computing platform 101. The number of Scalable IOV devices used in a computing platform is implementation dependent. Each ADI uses one or more device backend resources 330. For example, ADI 1 520 uses backend resource 1 528, ADI 2 522 uses backend resource 2 520, ADI 3 524 uses backend resource 3 532, backend resource 4 534, and backend resource 5 536, and ADI M 526 uses backend resource N 538. There may be any number of backend resources in Scalable IOV device 230. The number of backend resources in Scalable IOV device is implementation dependent.

Any virtual device 508, 510, 512 may take a slow path or a fast path for I/O requests. For example, virtual device 1 508 calls slow path software emulation 514 or fast path direct mapping 540 to ADI 1 520. For example, virtual device 1 508 also calls ADI 2 522 via fast path direct mapping 540. For example, virtual device 2 510 calls slow path software emulation 516 or calls ADI 3 524 via fast path direct mapping 542. For example, virtual device K 152 calls slow path software emulation 518 or calls ADI M 526 via fast path direct mapping 544.

Unlike SR-IOV VFs whose requests are tagged with each VF's unique Requester-ID (RID), in embodiments of the present invention requests from all ADIs of a PF are tagged with the RID of the PF. Instead, requests from ADIs are distinguished through a Process Address Space Identifier (PASID) in an end-to-end PASID TLP Prefix. The PCI Express specification defines the Process Address Space Identifier (PASID) in the PASID TLP Prefix of a transaction, which in conjunction with the RID, identifies the address space associated with the request.

The definition of the address space targeted by a PASID value is dependent on the Root Complex DMA remapping hardware capability and the programming of such hardware by software. Computing platforms with Intel® Virtualization Technology for Directed I/O, Rev 3.0 or higher, supports the Scalable IOV architecture through PASID-granular address translation capability. Depending on the programming of such DMA remapping hardware, the address space targeted by a request with PASID can be a Host Physical Address (HPA), Host Virtual Address (HVA), Host I/O Virtual Address (HIOVA), Guest Physical Address (GPA), Guest Virtual Address (GVA), Guest I/O Virtual Address (GIOVA), etc. All of these address space types can coexist on computing platform 101 for different PASID values and ADIs from one or more Scalable IOV devices may be configured to use these PASIDs.

When assigning an ADI to an address domain (e.g., VM 422, container, or process), the ADI is configured with the unique PASID of the address domain and the ADI's memory requests are tagged with the PASID value in the PASID TLP Prefix. If multiple ADIs are assigned to the same address domain, they may be assigned the same PASID. If ADIs belonging to a virtual device (VDEV) assigned to a VM are further mapped to secondary address domains (e.g., application processes) within the VM, each such ADI is assigned a unique PASID corresponding to the secondary address domain. This enables usages such as Shared Virtual Memory (SVM) within a VM, where a guest application process is assigned an ADI, and similar to nested address translation (GVA to GPA to HPA) for CPU accesses by the guest application, requests from the guest's ADI are also subjected to same nested translation by the DMA remapping hardware. Depending on the usage model, an ADI may also be allowed to use more than one PASID value and in this case the semantics of which PASID value to use with which request is Scalable IOV device dependent. For example, an ADI may be configured to access meta-data, commands and completions with one PASID that represents a restricted control domain, while the data accesses are associated with the PASID of the domain to which the ADI is assigned.

In an embodiment, devices 230 supporting the Scalable IOV architecture support the PASID capability as defined by the PCI Express specification and comply with all associated requirements. Before enabling ADIs on a PF 232, the PASID capability on PF 232 is enabled by software. Before an ADI is activated, the ADI is configured with a PASID value. All upstream memory requests (except Address Translation Service (ATS) translated requests) generated by ADIs are tagged with the assigned PASID value using the PASID TLP Prefix. In an embodiment, ADIs are not able to generate memory requests (except ATS translated requests) without a PASID or to generate memory requests with a PASID value in the PASID TLP Prefix that is not the ADI's assigned PASID value.

Each ADI's memory mapped I/O (MMIO) 322 registers are hosted within one or more of the PCI Express Base Address Registers (BARs) 320 of the hosting PF 232. Each ADI's MMIO 322 registers are contained in one or more system page size and aligned regions, and these may be contiguous or scattered regions within the PF's MMIO space 322. The association between the number and location of system page size regions within the PF's MMIO to specific ADIs is device-specific. The system page sizes supported by the Scalable IOV device is reported via the Intel Scalable IOV enumeration capability described below. In an embodiment, for Intel® 64-bit computing platforms, the system page size is 4 kilobytes (KBs).

Devices supporting the Scalable IOV architecture partition their ADI MMIO 322 registers into two categories: (a) MMIO registers accessed frequently for fast path operations; and (b) MMIO registers accessed infrequently for slow path (control, configuration, management etc.) operations. The definition of what operations are designated as slow path versus fast path is device-specific. PF 232 locates registers in these two categories in distinct system page size regions. This enables virtualization software such as host OS/VMM 228 to directly map fast path operations to one or more constituent ADIs while emulating slow path operations in software 514, 516, 518.

In an embodiment, devices implement 64-bit BARs 320 so that the address space above 4 gigabyte (GB) can be used for scaling ADI MMIO 322 resources. Additionally, since non-prefetchable BARs use MMIO space below 4 GB even with 64-bit BARs, in one embodiment devices implement prefetchable 64-bit BARs.

ADIs capable of generating interrupts generate only message signaled interrupts (MSIs) (no legacy interrupts). ADIs do not share interrupt resources/messages with the PF or with another ADI. An ADI may support one or more interrupt messages. For example, an ADI composed of N queues on a PF may support N interrupt messages to distinguish work arrivals or completions for each queue, where N is a natural number.

The Scalable IOV architecture enables device implementations to support a large number of ADIs, and each ADI may use multiple interrupt messages. To support the large interrupt message storage for all ADIs, a device-specific construct called Interrupt Message Storage (IMS) for ADIs 328 is defined. IMS 328 enables devices to store the interrupt messages for ADIs in a device-specific optimized manner without the scalability restrictions of the PCI Express defined MSI-X capability.

Even though the IMS storage organization is device-specific, in one embodiment IMS entries store and generate interrupts using the same interrupt message address and data format as with PCI Express MSI-X table entries. Interrupt messages stored in IMS 328 are composed of a DWORD size data payload and a 64-bit address. IMS 328 may also optionally support per-message masking and pending bit status, similar to the per-vector mask and pending bit array in the PCI Express MSI-X capability. In an embodiment, the IMS resource is programmed by the host driver 412.

PFs hosting the ADIs may support PCI Express defined MSI or MSI-X capability. Interrupts generated by PF 232 may use the PF's MSI or MSI-X capability 326 as specified by the PCI Express specification, while interrupts generated by ADIs may use the device-specific IMS 328. Specific host OS 150/VMM 180 implementations according to embodiments of the present invention support the use of IMS 328 for PF's interrupts and/or the use of PF's MSI-X table for ADI interrupts.

The size, location, and storage format for IMS 328 is device-specific. For example, some devices may implement IMS as on-device storage, while other stateful devices that manage contexts that are saved to and restored from primary memory 130 may implement IMS as part of the context privileged state. In either approach, devices may implement IMS 328 as either one unified storage structure or as de-centralized per ADI storage structures. If IMS 328 is implemented in host primary memory 130, ADIs may cache IMS entries on the Scalable IOV device. If the Scalable IOV device implements IMS caching, the Scalable IOV device also implements device specific interfaces for the device-specific driver to invalidate the IMS cache entries.

IMS 328 is managed by host driver software 412 and is not made accessible directly from guest or user-mode drivers in guest partitions 502, 504, 506. Within the Scalable IOV device, IMS storage is not directly accessible from the ADIs, and instead the ADIs can request interrupt generation only through the PF's 'Interrupt Message Generation Logic'. This ensures that ADIs cannot modify IMS contents and an ADI can indirectly generate interrupts only using IMS entries assigned by host driver software 412 to the corresponding ADI.

On Intel Architecture (IA) based 64-bit architecture computing platforms, message signaled interrupts are issued as DWORD size untranslated memory writes without a PASID TLP Prefix, to address range 0xFEExxxxx. Since all memory requests generated by ADIs include a PASID TLP Prefix while interrupt messages are generated without a PASID TLP prefix, it is not possible to generate a DMA write to the interrupt message address (0xFEExxxxx on IA based 64-bit computing platforms) through an ADI and cause the platform to interpret the DMA write as an interrupt message.

Operations or functioning of one ADI must not affect functioning of another ADI or functioning of PF 232. Every memory request (except ATS translated requests) from an ADI must be with a PASID TLP Prefix using the ADI's assigned PASID value in the PASID TLP prefix. The PASID identity for an ADI is accessed or modified by privileged software such as through host driver 412.

Since ADIs on Scalable IOV device 230 are part of PF 232, the PCI Express Access Control Service (ACS) capability is not applicable for isolation between ADIs. Instead, devices disable peer-to-peer access (either internal to the device or at I/O fabric egress) between ADIs and between ADIs and the PF. Independent of Scalable IOV architecture support, PF 232 may support ACS guidelines for isolation across endpoint functions or devices, per the PCI Express specification.

Quality of service (QoS) for ADIs are defined specific to a given Scalable IOV device. ADI QoS attributes are managed by host driver 412 and controlled by VDCM 402 through host driver 412 interfaces.

ADI specific errors are errors that can be attributed to a particular ADI such as malformed commands or address translation errors. Such errors do not impact functioning of other ADIs or the PF 232. Handling of ADI specific errors are implemented in device-specific ways.

Each ADI is independently resettable without affecting the operation of other ADIs. However, unlike SR-IOV VFs 214, ADIs do not support Function Level Reset (FLR) capability. Instead, reset of an ADI is performed through software interfaces to host driver 412 via ADI reset configuration 410 as shown in FIG. 4. To support ADI reset, Scalable IOV devices implement interfaces to abort (e.g., discard) in-flight and accepted operations to the ADI by a specific domain (or PASID). In an embodiment, a VDEV 404 composed out of ADIs may expose a virtual FLR capability that may be emulated by VDCM 402 by requesting host driver 412 to perform the ADI reset for the constituent ADIs 428, 430, 432 or 434 for VDEV 404.

An ADI reset ensures that the reset is not reported as complete until the following conditions are satisfied: a) all DMA write operations by the ADI are drained or aborted; b) all DMA read operations by the ADI have completed or aborted; c) all interrupts from the ADI have been generated; d) if ADI is capable of Address Translation Service (ATS), all ATS requests by the ADI have completed or aborted; and e) if the ADI is capable of Page Request Service (PRS), no more page requests will be generated by the ADI. Additionally, either page responses have been received for all page requests generated by the ADI or the ADI will discard page responses for any outstanding page requests.

In an embodiment, PFs 232 support Function Level Reset (FLR) and may optionally support additional device specific global reset control. Global reset operation and FLR on a PF 232 resets all of its ADIs and returns the PF to a state where no ADIs are configured.

In an embodiment, PFs 232 support saving and restoring ADI state to facilitate operations such as live migration and suspend/resume of virtual devices composed from such ADIs. For example, to support ADI suspend, Scalable IOV devices 230 implement interfaces to drain (i.e., complete) in-flight and accepted operations to the ADI by a specific domain (or PASID). In an embodiment, ADI suspend, ADI state save, ADI state restore, and ADI resume from restored state are also implemented through host driver 412 interfaces.

A PF 232 reports support for the Scalable IOV architecture to system software such as VDCM 402 through the host driver 412 interface. If host driver 412 reports support for the Scalable IOV architecture, host driver 412 supports an extended set of interfaces to enumerate, provision, instantiate, and manage ADIs on the PF. System software such as VDCM 402 performs all Scalable IOV specified operations on Scalable IOV device 230 through host driver 412.

Additionally, in one embodiment, a PCI Express Designated Vendor Specific Extended Capability (DVSEC) is defined for systems software such as VDCM 402 and software tools to detect devices supporting the Scalable IOV architecture, without host driver dependency. Host driver 412 is still responsible for enabling the Scalable IOV architecture and related operations through system software specific interfaces.

FIG. 6 illustrates a diagram of an example Scalable IOV DVSEC structure 600. The fields up to offset 0xA are the standard DVSEC capability header information. Refer to the PCI Express DVSEC header for a detailed description of these fields. The remaining fields are described below.

Function Dependency (DEP) Link (read-only (RO)) field 602 is at offset 0xA and has a size of one byte. The programming model for a device may have vendor-specific dependencies between sets of functions. Function Dependency Link field 602 is used to describe these dependencies. This field describes dependencies between PFs 232. ADI dependencies are the same as the dependencies of their PFs. If a PF 232 is independent from other PFs of a Scalable IOV device 230, this field contains the PF's own Function Number. If a PF is dependent on other PFs of a Scalable IOV device, this field contains the Function Number of the next PF in the same Function Dependency List (FDL). The last PF in an FDL contains the Function Number of the first PF in the FDL.

Dependencies between PFs are described by the Flags field 604 at offset 0xB. Flags field 604 (read only) is at offset 0xB and has a size of one byte. In an embodiment, Flags 604 field includes a homogeneous (H) flag in bit 0 of the byte, and bits 1 through 7 are reserved. When the H flag is reported as set, the H flag indicates that all PFs in the FDL must be enabled (in device-specific manner) for Scalable IOV operation. If some but not all of the PFs in the FDL are enabled for Scalable IOV operation, the behavior is undefined (i.e., one PF cannot be in Scalable IOV operation mode and another in SR-IOV operation mode if the H flag is reported as set). If H flag is not set, PFs in the FDL can be in different modes.

Supported Page Sizes (read only) field 606 is at offset 0xC and has a size of four bytes. Supported Page Sizes field 606 indicates page sizes supported by PF 232. The PF supports a page size of $2^{n+12}$ if bit n is set. For example, if bit 0 is set, the PF supports 4 KB pages. The page size describes the minimum alignment requirements for ADI MMIO 322 pages so that they can be independently assigned to different address domains. In an embodiment, PFs are required to support 4 KB page sizes. PFs may support additional system page sizes for broad compatibility across host platform architectures.

System Page Size (read-write (RW)) field 608 is at offset 0x10 and has a size of four bytes. System Page Size field 608 defines the page size the system uses to map the ADIs' MMIO 322 pages. Software sets the value of the system page size to one of the page sizes set in the Supported Page Sizes field. As with Supported Page Sizes, if bit n is set in System Page Size, the ADIs associated with this PF support a page size of $2^{n+12}$. For example, if bit 1 is set, the device uses an 8 KB page size. The behavior is undefined if System Page Size is zero, more than one bit is set, or a bit is set in the System Page Size field that is not set in supported page sizes.

When System Page Size field 608 is written, PF 232 aligns all ADI MMIO 322 resources on system page size boundaries. System page size must be configured before setting the Memory Space Enable bit in the PCI command register of the PF. The behavior is undefined if System Page Size is modified after memory space enable bit is set. A default value is 0000 0001h, indicating a system page size of 4 KB.

Capabilities (read only) field 610 is at offset 0x14 and has a size of four bytes. In an embodiment, Capabilities field 610 includes an IMS Support flag in bit 0, and bits 1 to 31 are reserved. The IMS Support flag indicates support for Interrupt Message Storage (IMS) in the device. When the IMS Support flag is 0, IMS is not supported by the device. When the IMS Support flag is 1, IMS is supported by the device.

If virtualization software (such as VDCM 402) does not support IMS use by the PF itself (IMS use supported only for PFs ADIs), when the PF is directly assigned to a domain, for compatibility, virtualization software may expose a virtual Scalable IOV capability to the domain with the IMS Support flag reported as 0.

In an embodiment, the Scalable IOV architecture relies on the following platform level capabilities: a) support for PCI Express PASID TLP Prefix in supporting Root Ports (RPs), Root Complex (RC), and DMA remapping hardware units (refer to the PCI Express Revision 4.0 specification for details on PASID TLP Prefix support); and b) PASID-granular address translation by DMA remapping hardware such as that defined by scalable mode address translation in Intel® Virtualization Technology (Intel® VT) for Directed I/O (Intel® VT-d), Revision 3.0 or higher.

Scalable mode address translation as defined by Intel VT-d involves a three-stage address translation. Other embodiments may use other methods. First, the Requester-ID (RID) (Bus/Device/Function numbers) in upstream requests are used to consult the Root and Context structures that specify translation behavior at RID (PF or SR-IOV VF) granularity. The context structures refer to PASID structures. Second, if the request includes a PASID TLP Prefix, the PASID value from the TLP prefix is used to consult the PASID structures that specify translation behavior at PASID (target address domain) granularity. If the request is without a PASID TLP Prefix, the PASID value programmed by software in the Context structure is used instead. For each PASID, the respective PASID structure entry can be programmed to specify first-level, second-level, pass-through or nested translation functions, along with references to first-level and second-level page-table structures. Finally, the address in the request is subject to address translation using the first-level, second-level or both page-table structures, depending on the type of translation function.

The PASID granular address translation enables upstream requests from each ADI on a PF to have a unique address translation. Any such ADIs 428, 430, 432, or 434 on a PF 232 can be used by VDCM 402 to compose virtual devices 404 that may be assigned to any type of address domain (such as guest physical address space of a VM or machine container, I/O virtual address for a bare-metal container, shared CPU virtual address for an application process, or such guest containers or processes operating within a VM).

For interrupt isolation across devices, host system software, such as Host OS 150, VMM 180, and/or VDCM 402 enables interrupt remapping and uses remappable interrupt message format for all interrupt messages programmed in MSI, MSI-X 326, or IMS 328 on the device. Refer to the Intel Virtualization Technology for Directed I/O specification for details on interrupt remapping.

In various embodiments, computing platforms supporting the Scalable IOV architecture also support Posted Interrupts capability. Posted Interrupts enables scalable interrupt virtualization by enabling interrupt messages to operate in guest interrupt vector space without consuming host processor interrupt vectors. It additionally enables direct delivery of virtual interrupts to active virtual processors without hypervisor processing overheads. Refer to Intel Virtualization Technology for Directed I/O architecture specification for details on posted interrupts. Posted interrupt operation is transparent to endpoint devices.

Figure 7:
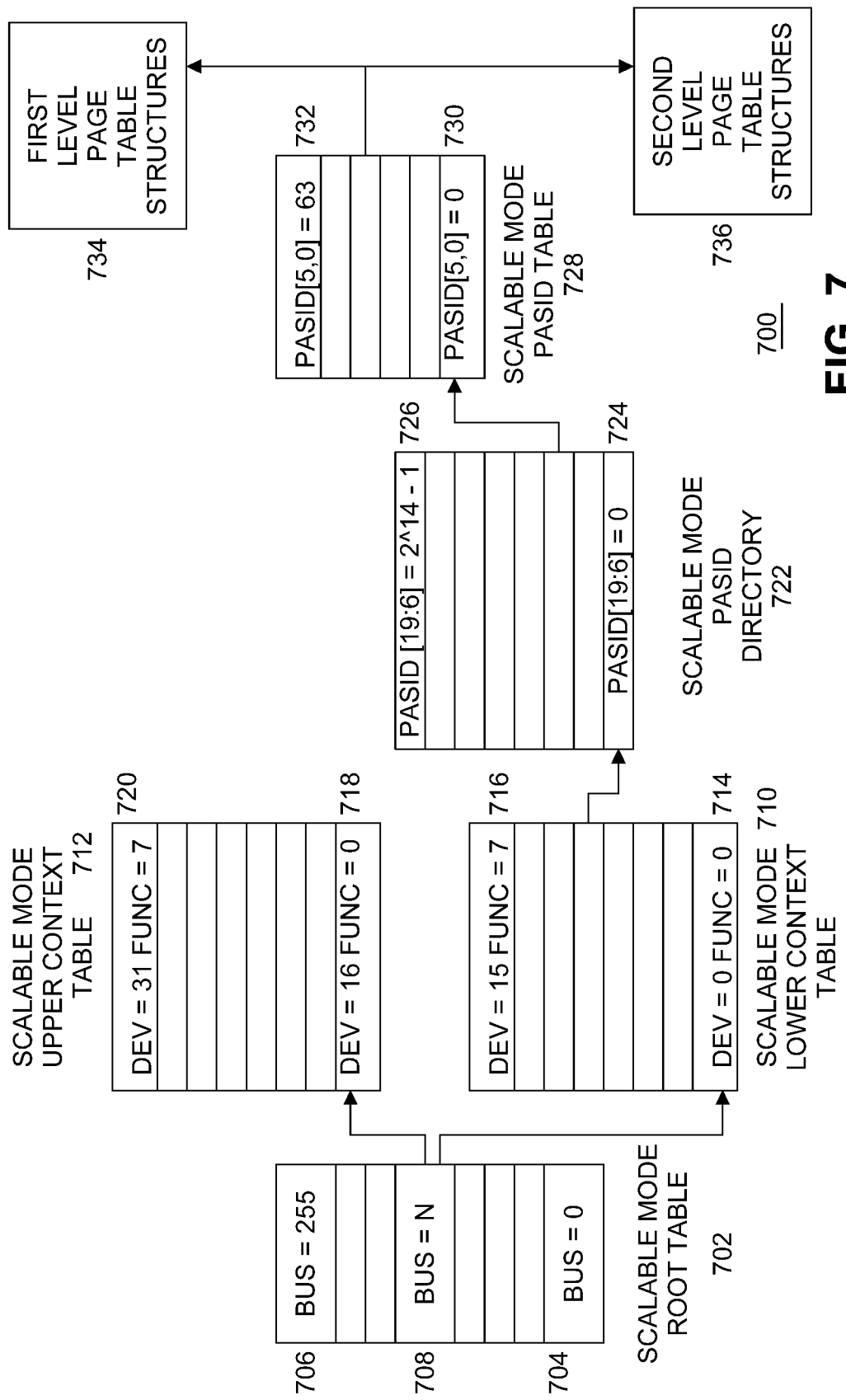
FIG. 7 illustrates an example high-level translation structure organization for scalable mode address translation.

FIG. 7 illustrates an example high-level translation structure organization 700 for scalable mode address translation. In an embodiment, scalable mode address translation is accomplished using scalable mode root table 702. Scalable mode root table 702 includes a plurality of entries. In this example, the number of entries in the scalable mode root table is 256, the maximum number of buses possible in computing platform 101. An example entry N 708 in scalable mode root table 702 points to an entry in scalable mode lower context table 710 and to an entry in scalable mode upper context table 712. In an embodiment, there are 128 entries in scalable mode lower context table 710, numbered as device (DEV)=0 entry 714 up to device=15 entry 716 (each of the 16 devices has eight entries). Each entry in scalable mode lower context table specifies a function. Functions IDs are numbers between 0 and 7 in one embodiment. In an embodiment, there are 128 entries in scalable mode upper context table 712, numbered as device=16 entry 718 up to device=31 entry 720 (each of the 16 devices has eight entries). Each entry in scalable mode upper context table specifies a function. A selected entry in either scalable mode lower context table 710 or scalable mode upper context table 712 points to scalable mode PASID directory 722. In an embodiment, there are $2^{14}$ entries in scalable mode PASID directory 722, from entry number 0 724 to entry number $2^{14}$-1 726. The index into the directory is formed from bits 6 through 19 of a PASID in one embodiment. A selected entry in scalable mode PASID directory 722 points to a selected entry in scalable mode PASID table 728. In an embodiment, there are 64 entries in scalable mode PASID table 728, from entry number 0 730 to entry number 63 732. The index into scalable mode PASID table 728 is formed from bits 0 through 5 of a PASID in one embodiment. A selected entry in scalable mode PSID table 728 points to first level page table structures 734 and to second level page table structures 736.

Figure 8:
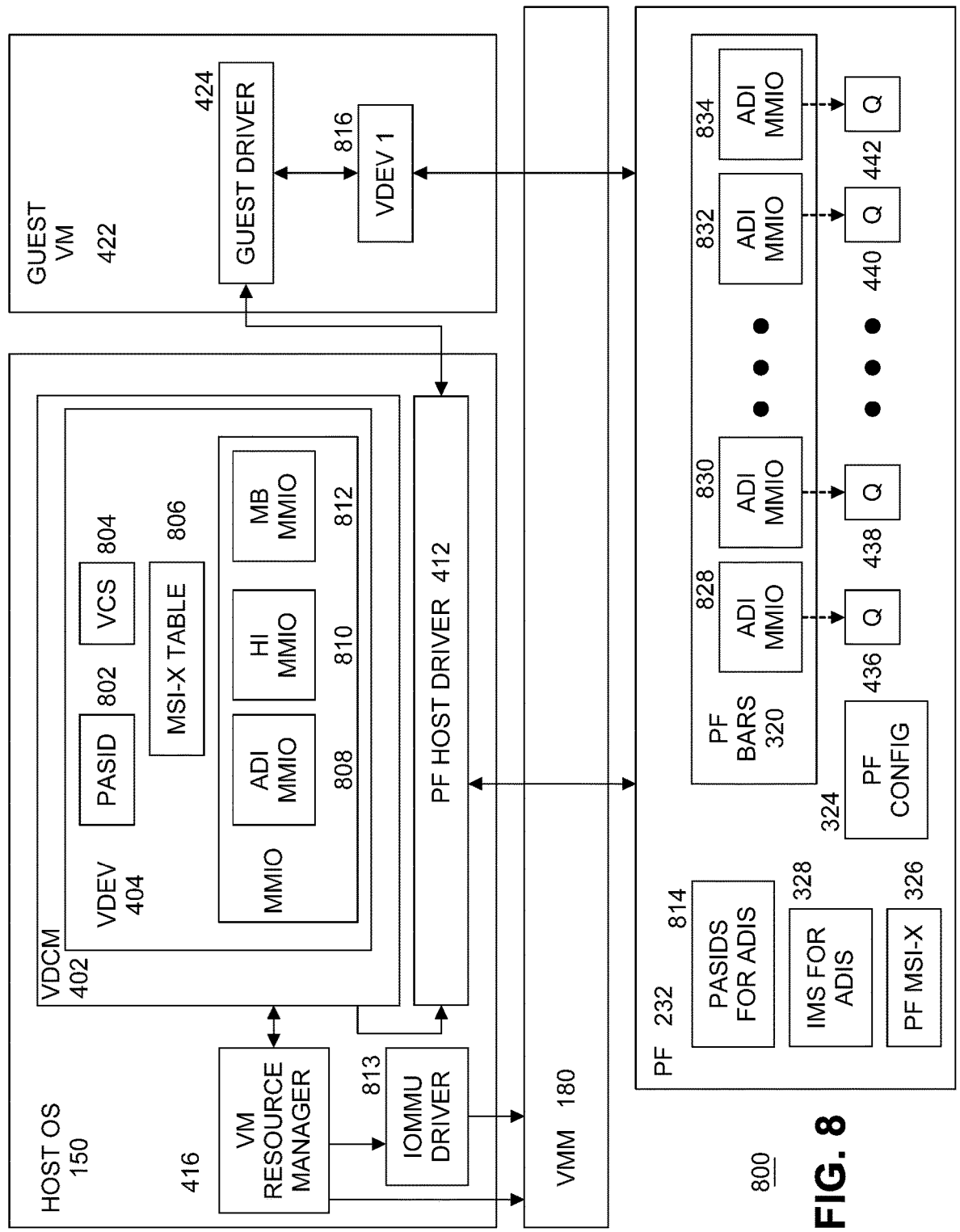
FIG. 8 illustrates an example diagram of virtual device composition.

FIG. 8 illustrates an example diagram of virtual device composition 800. Host OS 150 includes VDCM 402 to use VDEV template 404 to instantiate a virtual device VDEV 1 816 for operation with guest driver 424 in guest VM 422. VDEV 404 includes PASID 802 to uniquely identify the VDEV instance (e.g., VDEV 1 816). VDEV 404 includes virtual PCI configuration space (VCS) 804 to define parameters for the VDEV instance, such as capabilities (e.g., MSI-X, BARs, and other PCI capabilities), error handling, quality of service (QoS) settings, and reset indicators. VDEV 404 includes MSI-X table 806 to store a plurality of MSI-X interrupt entries. VDEV 404 includes MMIO fields for mapping addresses of registers in PF 232 for fast path ADI MMIO 808, software emulated, hypervisor intercepted (HI) MMIO 810, and memory-backed (MB) MMIO 812. ADI MMIO 808 provides fast path resources for VDEV 404. VM resource manager 416 provides services to VDCM 402, assigns PASIDs to VDEVs, and triggers VDEV composition. IOMMU driver 813 configures translation tables for IOMMU with scalable IOV extensions 414 for a PASID assigned to VEV 404.

Physical function (PF) 232 includes PF base address registers (BARs) 320, which comprise one or more ADI MMIO registers 322, denoted ADI MMIO 828, ADI MMIO 830, . . . ADI MMIO 832, ADI MMIO 834 in FIG. 8. A Base Address Register (BAR) is used to specify how much memory a device (e.g., PF) wants to be mapped into primary memory 130, and after device enumeration, a BAR holds the (base) address, where the mapped memory block begins. ADI MMIO registers 828, 830, . . . 832, 834 are used by VDEVs to directly communicate with hardware queues 436, 438, . . . 440, 442. PF 232 includes PF config 324 to define PCI configuration parameters for the PF, such as device vendor ID, BARs, error reporting, etc. PF 232 stores PASIDs for ADIs 814, and PF MSI-X 326 provides the MSI-X capability as defined by the PCI Express Base Specification. IMS for ADIs 328 enables PF 232 to store interrupt messages for ADIs in a PF-specific optimized manner without the scalability restrictions of the PCI Express defined MSI-X capability. In one embodiment, interrupt messages are used to indicate that data (e.g., packets) are available in queues 436, 438, . . . 440, 442 to be processed by VDEV 1 816.

The life cycle of a VDEV is divided into four stages: 1) VM and VDEV definition; 2) VM instantiation and VDEV composition; 3) Runtime VDEV resource modification; and 4) VM shutdown and VDEV decomposition.

At the first stage, a user (such as a system administrator, a remotely run script, or other control mechanism) selects resources for a VM to be instantiated (e.g., guest VM 422 and other guest VMs). VM resources include virtual processors, memory, and physical devices such as network devices, storage devices, graphics processing units (GPUs), field programmable gate arrays (FPGAs), accelerator devices, etc. The user also selects, depending on a VDEV type (such as network, storage, GPU, FPGA, accelerator, etc.), resources for each VDEV to be instantiated. For example, for a network VDEV, the user may select initial resources such as a number of receive (Rx) and transmit (Tx) queues and a number of IMS entries, and a maximum number of resources of each type that a VDEV can request during the lifespan of the VDEV instance. In one example, a network VDEV is instantiated with two ADIs and N entries in IMS for ADIs 328, where N is a natural number, but additional ADIs and IMS entries may be requested and added during runtime due to processing workloads. In an embodiment, a number of ADIs for a VDEV is the same as a number of interrupt entries in IMS for ADIs 328. That is, there is a one-to-one correspondence between an ADI and an interrupt entry in IMS for ADIs 328.

Figure 9:
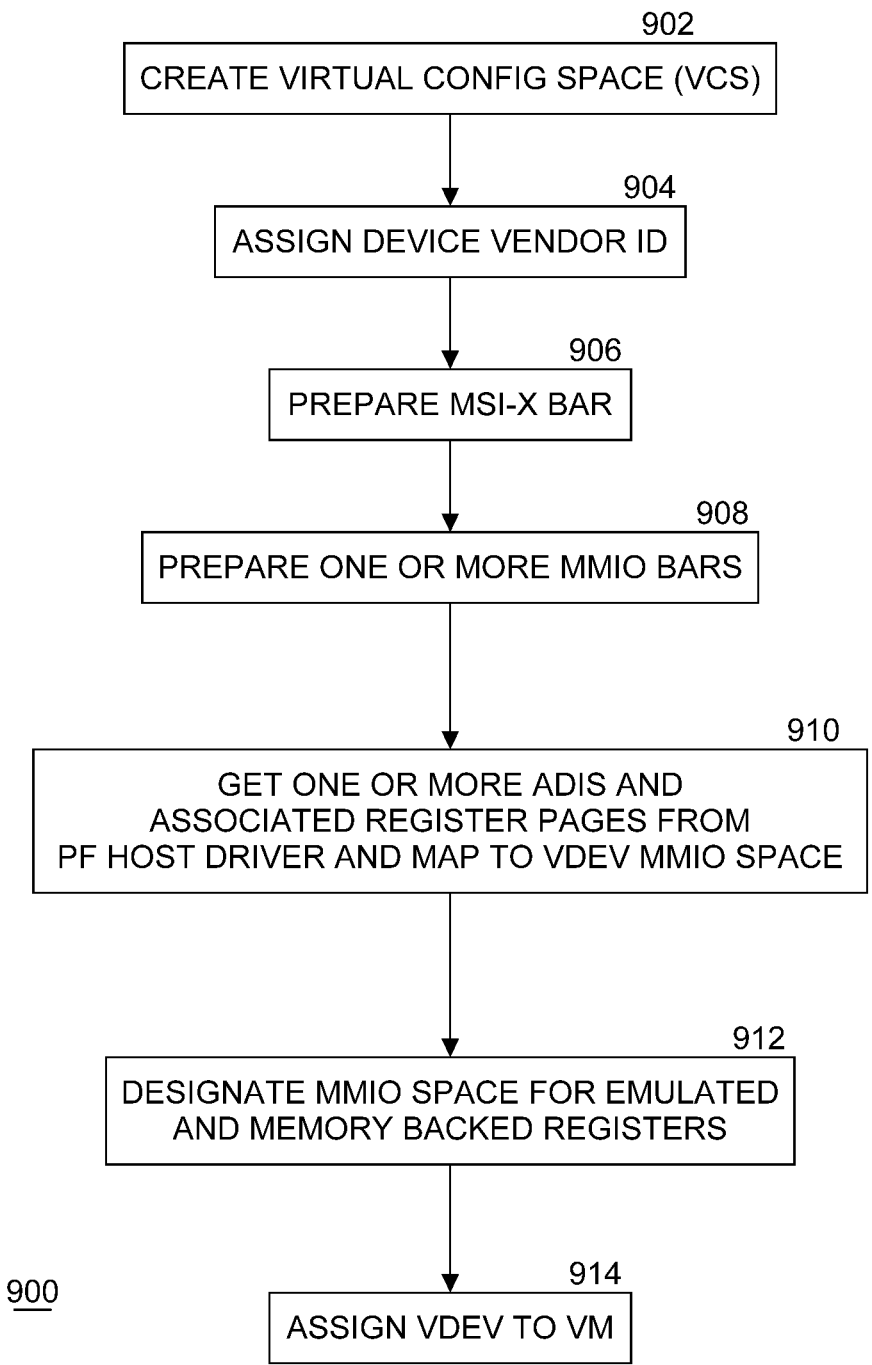
FIG. 9 illustrates an example flow diagram of virtual device composition.

At the second stage, a VM is instantiated (e.g., a guest VM 422) and associated one or more VDEVs are composed by VDCM 402 along with S-IOV capable PF host driver 412. FIG. 9 illustrates an example flow diagram 900 of virtual device composition. After a VDEV (such as VDEV 1 816) is instantiated by VDCM 402, at block 902 VDCM 402 creates virtual PCI configuration (config) space (VCS) 804 in VDEV 1 816. VDCM 402 then populates values into VCS 804 fields in the following three blocks. At block 904, VDCM 402 assigns a device vendor ID of PF 232 to VCS 804 in VDEV 1 816. This associates PF 232 with VDEV 1 816. At block 906, VDCM 402 prepares MSI-X BAR in VCS 804 of VDEV 1 816 by setting locations in primary memory 130 representing the VDEV. At block 908, VDCM 402 prepares one or more MMIO BARs in VCS 804 of VDEV 1 816 by setting locations in primary memory. In an embodiment, MMIO memory space is provisioned for a VDEV for a maximum amount of resources a VDEV can have in the VDEV's lifetime, but initially the VDEV is configured with fewer resources. At block 910, VDCM 402 gets one or more ADIs and associated register pages from PF host driver 412 and maps the ADIs and associated register pages to VDEV MMIO space. At block 912, VDCM 402 designates MMIO space for software emulated HI MMIO registers 810 and memory backed MB MMIO registers 812. At block 914, VDCM 402 assigns the instantiated VDEV (e.g., VDEV 1 816) to guest VM 422.

Figure 10:
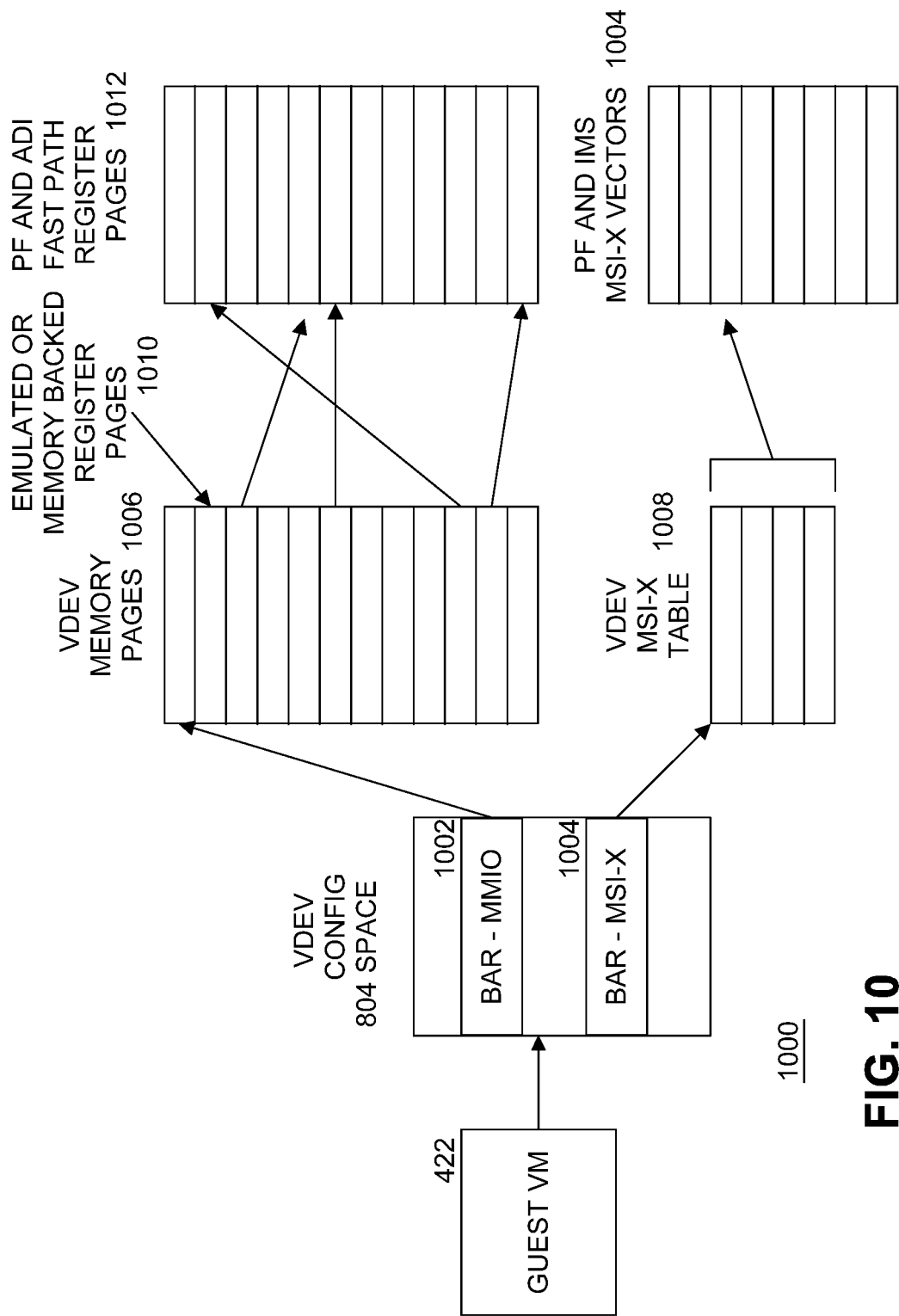
FIG. 10 illustrates an example diagram of virtual device composition using physical function ADIs and Interrupt Message Services (IMS) resources.

FIG. 10 illustrates an example diagram of virtual device composition 1000 using physical function ADIs and Interrupt Message Services (IMS) resources. For example, a network VDEV is instantiated and composed of ADIs, where each ADI represents a set of receive/transmit queues and PF IMS resources are used to communicate with the VDEV's MSI-X configuration. Additionally, VDEV MMIO is configured by the VDCM for emulated HI MMIO registers 810 (e.g., a slow path interface) where high performance processing is not required. In an embodiment, the behavior of the emulated HI MMIO registers 810 is implemented by VDCM 402 and PF host driver 412. Guest VM 422 accesses BAR for MMIO 1002 in VDEV config space (VCS) 804. BAR for MMIO 1002 points to a location in VDEV memory pages 1006. VDEV memory pages 1006 are resident in primary memory 130 on host computing platform 101. The location in VDEV memory pages 1006 is mapped to a location in physical function address space represented as PF and ADI fast path register pages 1012 on PF 232. Software emulated HI MMIO or memory backed registers pages 1010 also point to VDEV memory pages 1006. Guest VM 422 also accesses BAR for MSI-X 1004 in VCS 804. BAR for MSI-X 1004 points to a location in VDEV MSI-X Table 1008, which is an instance of MSI-X table 806. The location in VDEV MSI-X table 1008 points to a location in PF and IMS MSI-X vectors 1004. In an embodiment, PF and IMS MSI-X vectors 1004 is the same as PF MSI-X 326.

In an embodiment, IMS is located in PF MMIO space, which can include MSI-Z table entries of both the PF and VDEVs. One benefit of IMS is that unlike the MSI-X table, IMS is not restricted to a maximum size of 2K. Since IMS is in PF MMIO space, IMS can support many MSI-X like entries (e.g., more than 2K).

Typical hardware supporting SR-IOV have hard-coded MMIO space definitions, which include the maximum MMIO BAR size, and fixed locations of resources and registers. Hard-coding MMIO space definitions limits the flexibility of exposing and hiding features and functionality to a PF. Hard-coding MMIO space definition also makes it difficult to relocate registers if needed. Further, hard-coding MMIO space definitions results in MMIO BARs that are fixed in size, which limits adding support for additional resources such as the number of queues exposed to the PF.

At least one embodiment of the present invention provides for flexible and dynamic definition of the MMIO space for a VDEV instead of hard-coding. VDEV MMIO space is provided for only the necessary features and resources for the VDEV. Flexible and dynamic VDEV MMIO space definition provides for better security by only exposing necessary registers to untrusted VMs and containers in cloud deployments. Having the capability for flexible and dynamic VDEV MMIO space definition allows the system to have a simplified hardware implementation for the ADI-related fast path registers (ADI MMIO 828, 830, . . . 832, 834) in PF MMIO BARs 320. VDCM 402 can flexibly map these registers along with other enumerated registers (e.g., HI MMIO 808) based at least in part on user input data into the VDEV MMIO space in VDEV memory pages 1006.

VDCM 402 defines the size of MMIO BAR 1002 while composing the VDEV. The VDCM accounts for the resources required for a VDEV while determining the total MMIO BAR 1002 size. Additionally, the VDCM determines whether to expose or to hide selected registers based at least in part on user input data. The VDCM advertises the MMIO BAR definition in a predefined format at a predefined location in VDEV MMIO space so that the VDEV can access the MMIO BAR definition, location of registers, and the maximum resources that can be supported for a selected VDEV MMIO space.

FIG. 11 illustrates an example diagram of a VDEV MMIO BAR definition advertisement page 1100. In an embodiment, VDEV MMIO BAR definition advertisement page 1100 is one or more pages in VDEV memory pages 1006 shown in FIG. 10. In an embodiment, VDEV MMIO BAR definition advertisement page 1100 is the first page in VDEV memory pages 1006. While VDCM 402 prepares the one or more MMIO BARs at block 908 of FIG. 9 as part of instantiation of VDEV 1 816, VDCM in one embodiment also prepares VDEV MMIO BAR definition advertisement page 1100 for VDEV 1 816. VDEV MMIO BAR definition advertisement page 1100 is read by guest driver 424 of guest VM 422 for use in future communication and/or MMIO data transfers with PF 232 via VDEV 1 816. VDCM populates the values of the advertisement page based at least in part on user input data. VDEV MMIO BAR definition advertisement page 1100 includes a section for each type of resource allocated to the VDEV. In one embodiment, there are N different sections 1102, 1104, . . . 1106, one for each of N different types of resources, where N is a natural number. Each section includes a description of the type of resource, a list of the registers of the type (e.g., ADI, HI, or MB), and offset, count, and stride fields. The offset field stores a beginning address of a type of resource in VDEV MMIO space in VDEV memory pages 1006. The count field stores a maximum number of entries in the advertisement page for the type. The stride field stores how far apart each entry of the type is from a previous entry.

In one example, a type refers to a set of network resources for a VDEV representing a networking device (e.g., PF 232). For example, the registers are ADI MMIO registers 828, 830, . . . 832, 834, and the type description describes transmit (TX) queues. In other examples, the type description describes receive (RX) queues, remote direct memory access (RDMA) queues, and interruption moderation.

Figure 12:
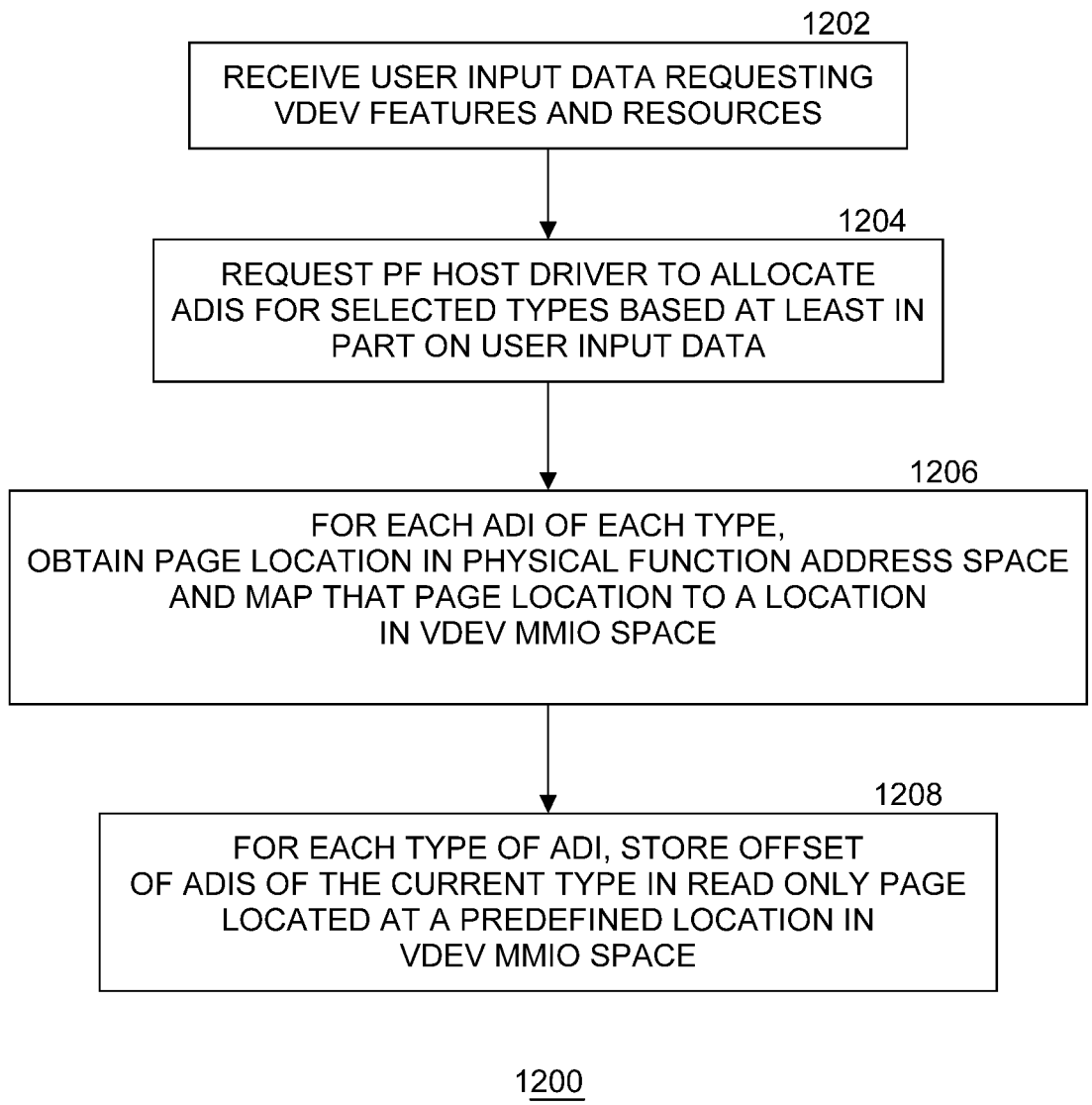
FIG. 12 illustrates an example flow diagram of preparing the MMIO space of a virtual device.

FIG. 12 illustrates an example flow diagram 1200 of preparing the MMIO space of a VDEV. At block 1202, VDCM 402 receives user input data requesting VDEV features and/or resources for a VDEV to be instantiated by the VDCM. In an embodiment, a feature includes resources. For example, a network VDEV feature includes Rx/Tx queues. In another example, a VDEV for RDMA includes RDMA queues. In an embodiment, the user input data is provided by a system administrator of computing platform 101 using a system call to host OS 150. At block 1204, VDCM 402 requests PF host driver 412 to allocate ADIs of selected types based at least in part on the user input data. For example, when the user input data requests setup of a networking virtual device, then the type is networking device and the ADIs may be queues 436, 438, . . . 440, 442 referenced by ADI MMIO registers 828, 830, . . . 832, 834, respectively.

At block 1206, VDCM 402, for each ADI of each type, obtains a page location in PF 232 address space in PF and ADI fast path register pages 1012 for the current ADI and dynamically maps this page location to a location in VDEV MMIO space in VDEV memory pages 1006. This mapping allows VDEV 1 816 to directly access ADIs in PF 232 using MMIO operations. In an embodiment, no hard-coding of the mapping is used. At block 1208, VDCM 402, for each type of ADI, stores the offset (within VDEV MMIO space) of ADIs of the current type in a read-only advertisement page located at a predetermined location in VDEV MMIO space.

FIG. 12 describes processing for ADIs at blocks 1204, 1206, and 1208. In an embodiment, similar processing is performed for HI MMIO 810. In another embodiment, similar processing is performed for MB MMIO 812.

Figure 13:
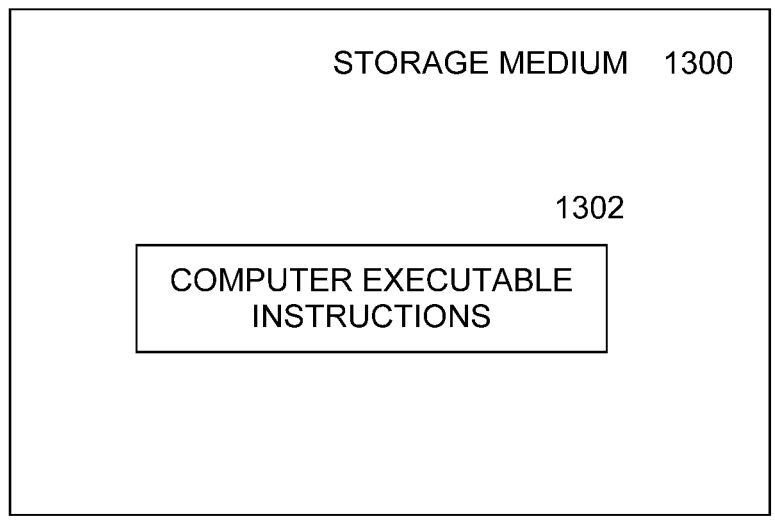
FIG. 13 illustrates an example of a storage medium.

FIG. 13 illustrates an example of a storage medium 1300. Storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions 1302 to implement logic flows of S-IOV architecture components, including those described in FIGS. 9, 11, and 12. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
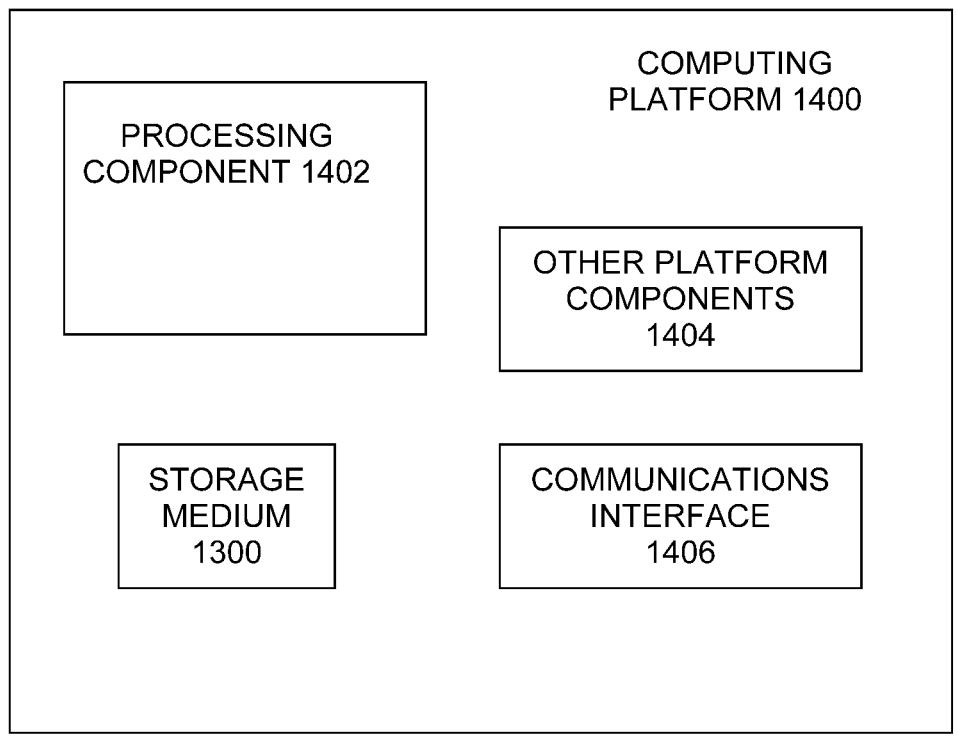
FIG. 14 illustrates another example computing platform.

FIG. 14 illustrates an example computing platform 1400. In some examples, as shown in FIG. 14, computing platform 1400 may include a processing component 1402, other platform components 1404 and/or a communications interface 1406.

According to some examples, processing component 1402 may execute processing operations or logic for instructions stored on storage medium 1300. Processing component 1402 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1404 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1406 may include logic and/or features to support a communication interface. For these examples, communications interface 1406 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 1400, including logic represented by the instructions stored on storage medium 1300 may be implemented using any combination of discrete circuitry, ASICs, logic gates and/or single chip architectures. Further, the features of computing platform 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method utilized in an architecture consistent with an Scalable I/O Virtualization (S-IOV) specification, the method comprising:
   instantiating a virtual machine;
   instantiating a virtual device to transmit data to and receive data from assigned resources of a shared physical device by:
      receiving input data requesting assigned resources for the virtual device,
      allocating assigned resources to the virtual device based at least in part on the input data, and
      mapping a page location in an address space of the shared physical device for a selected one of the assigned resources to a page location in a memory-mapped input/output (MMIO) space of the virtual device; and
   specifying a size allocated to store a MMIO base address register (BAR) definition, wherein the MMIO BAR is an adjustable size, wherein the virtual device and the shared physical device are utilized in an architecture consistent with the S-IOV specification; and
   assigning the virtual device to the virtual machine, the virtual machine to transmit data to and receive data from the shared physical device via the MMIO space of the virtual device.

2. The method of claim 1, wherein instantiating the virtual device comprises storing an offset of the selected one of the assigned resources into a read-only page located at a predefined location in the MMIO space of the virtual device.

3. The method of claim 2, wherein the selected one of the assigned resources belongs to a type of resource and storing the offset comprises storing the offset for assigned resources of the type for the virtual device.

4. The method of claim 1, comprising preparing the MMIO BAR definition page for the virtual device, the MMIO BAR definition page including information describing types of resources of the shared physical device assigned to the virtual device.

5. The method of claim 4, comprising the virtual machine reading the MMIO BAR definition page to transmit data to and receive data from the shared physical device via the MMIO space of the virtual device.

6. The method of claim 1, wherein the assigned resources comprise shared physical device resources assigned to the virtual device for data transfers.

7. The method of claim 6, wherein the shared physical device comprises a network controller device, the shared physical device resources comprise receive and transmit queues to store the data, and the data comprises packets.

8. The method of claim 1, wherein the shared physical device comprises a storage controller device.

9. At least one tangible non-transitory machine-readable medium comprising a plurality of instructions that in response to being executed by at least one processor cause the at least one processor utilized in an architecture consistent with an Scalable I/O Virtualization (S-IOV) specification, to:
   instantiate a virtual machine;
   instantiate a virtual device to transmit data to and receive data from assigned resources of a shared physical device by:
      receiving input data requesting assigned resources for the virtual device,
      allocating assigned resources to the virtual device based at least in part on the input data, and
      mapping a page location in an address space of the shared physical device for a selected one of the assigned resources to a page location in a memory-mapped input/output (MMIO) space of the virtual device; and
   specifying a size allocated to store a MMIO base address register (BAR) definition, wherein the MMIO BAR is an adjustable size, wherein the virtual device and the shared physical device are utilized in an architecture consistent with the S-IOV specification; and assign the virtual device to the virtual machine, the virtual machine to transmit data to and receive data from the shared physical device via the MMIO space of the virtual device.

10. The at least one tangible machine-readable medium of claim 9, wherein instructions to instantiate the virtual device comprise instructions, that in response to being executed by the at least one processor, cause the at least one processor to store an offset of the selected one of the assigned resources into a read-only page located at a predefined location in the MMIO space of the virtual device.

11. The at least one tangible machine-readable medium of claim 10, wherein the selected one of the assigned resources belongs to a type of resource and instructions to store the offset comprise instructions to store the offset for assigned resources of the type for the virtual device.

12. The at least one tangible machine-readable medium of claim 9, comprising instructions, that in response to being executed by the at least one processor, cause the at least one processor to prepare the MMIO BAR definition page for the virtual device, the MMIO BAR definition page including information describing types of resources of the shared physical device assigned to the virtual device.

13. The at least one tangible machine-readable medium of claim 12, comprising instructions, that in response to being executed by the at least one processor, cause the at least one processor to: for the virtual machine, to read the MMIO BAR definition page to transmit data to and receive data from the shared physical device via the MMIO space of the virtual device.

14. The at least one tangible machine-readable medium of claim 9, comprising instructions, that in response to being executed by the at least one processor, cause the at least one processor to execute a virtual device composition module (VDCM) is to perform the specifying a size allocated to store a MMIO BAR definition.

15. The at least one tangible machine-readable medium of claim 9, wherein the instantiate a virtual device comprises identify one or more registers associated with the MMIO BAR definition.

16. An apparatus utilized in an architecture consistent with an Scalable I/O Virtualization (S-IOV) specification, the apparatus comprising:
at least one processor; and
a machine-readable storage storing instructions, the instructions executable by the at least one processor to:
execute a virtual machine; and
execute a virtual device composition module (VDCM) coupled to the virtual machine to instantiate a virtual device to transmit data to and receive data from assigned resources of a shared physical device by:
receive input data requesting assigned resources for the virtual device,
allocate assigned resources to the virtual device based at least in part on the input data, and
map a page location in an address space of the shared physical device for a selected one of the assigned resources to a page location in a memory-mapped input/output (MMIO) space of the virtual device; and
specify a size allocated to store a MMIO base address register (BAR) definition, wherein the MMIO BAR is adjustable in size, wherein the virtual device and the shared physical device are utilized in an architecture consistent with the S-IOV specification; and
assign the virtual device to the virtual machine, the virtual machine to transmit data to and receive data from the shared physical device via the MMIO space of the virtual device.

17. The apparatus of claim 16, wherein the virtual device composition module is to instantiate the virtual device by storing an offset of the selected one of the assigned resources into a read-only page located at a predefined location in the MMIO space of the virtual device.

18. The apparatus of claim 17, wherein the selected one of the assigned resources belongs to a type of resource and storing the offset comprises storing the offset for assigned resources of the type for the virtual device.

19. The apparatus of claim 16, wherein the assigned resources comprise shared physical device resources assigned to the virtual device for data transfers.

20. The apparatus of claim 19, wherein the shared physical device comprises a network controller device, the shared physical device resources comprise receive and transmit queues to store the data, and the data comprises packets.

21. The apparatus of claim 16, wherein the shared physical device comprises a storage controller device.

* * * * *